(12) United States Patent
Cunningham et al.

(10) Patent No.: US 8,260,562 B2
(45) Date of Patent: *Sep. 4, 2012

(54) METER ELECTRONICS AND METHODS FOR GENERATING A DRIVE SIGNAL FOR A VIBRATORY FLOWMETER

(75) Inventors: Timothy J Cunningham, Boulder, CO (US); William M Mansfield, Boulder, CO (US); Craig B McAnally, Thornton, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/049,646

(22) Filed: Mar. 16, 2011

(65) Prior Publication Data

US 2011/0166801 A1 Jul. 7, 2011

Related U.S. Application Data

(63) Continuation of application No. 12/066,910, filed as application No. PCT/US2006/035706 on Sep. 13, 2006, now Pat. No. 7,983,855.

(60) Provisional application No. 60/718,941, filed on Sep. 20, 2005.

(51) Int. Cl.
*G01F 15/00* (2006.01)
*G01F 5/00* (2006.01)
*G01F 1/00* (2006.01)
*G01F 1/20* (2006.01)
*G01N 11/00* (2006.01)

(52) U.S. Cl. ............... 702/45; 702/48; 702/50; 702/54; 73/861.18

(58) Field of Classification Search ............ 702/45, 702/48, 50, 54–56, 137; 73/861.01, 861.04, 73/861.18, 200
See application file for complete search history.

(56) References Cited

U.S. PATENT DOCUMENTS

| 5,009,109 | A | | 4/1991 | Kalotay et al. |
| 5,578,764 | A | | 11/1996 | Yokoi et al. |
| 5,672,949 | A | * | 9/1997 | Ward ........................ 318/609 |
| 7,117,104 | B2 | * | 10/2006 | Urdaneta et al. ............ 702/48 |
| 7,983,855 | B2 | * | 7/2011 | Cunningham et al. ....... 702/45 |

(Continued)

FOREIGN PATENT DOCUMENTS

JP 2003130704 A 5/2003

(Continued)

*Primary Examiner* — Mohamed Charioui
*Assistant Examiner* — Ricky Ngon
(74) *Attorney, Agent, or Firm* — The Ollila Law Group LLC

(57) ABSTRACT

A meter electronics (20) for generating a drive signal for a vibratory flowmeter (5) is provided according to an embodiment of the invention. The meter electronics includes an interface (201) and a processing system (203). The processing system is configured to receive the sensor signal (201) through the interface, phase-shift the sensor signal (210) substantially 90 degrees to create a phase-shifted sensor signal, determine a phase shift value from a frequency response of the vibratory flowmeter, and combine the phase shift value with the sensor signal (201) and the phase-shifted sensor signal in order to generate a drive signal phase (213). The processing system is further configured to determine a sensor signal amplitude (214) from the sensor signal (210) and the phase-shifted sensor signal, and generate a drive signal amplitude (215) based on the sensor signal amplitude (214), wherein the drive signal phase (213) is substantially identical to a sensor signal phase (212).

8 Claims, 20 Drawing Sheets

U.S. PATENT DOCUMENTS

2002/0189323 A1   12/2002   Francisco et al.

FOREIGN PATENT DOCUMENTS

| | | |
|---|---|---|
| JP | 2004503256 | 2/2004 |
| JP | 2004506410 | 3/2004 |
| JP | 200829229 A | 8/2008 |
| RU | 2003127832 A | 2/2005 |
| WO | 0196866 | 6/1991 |
| WO | 9108446 | 6/1991 |
| WO | 9108447 | 6/1991 |
| WO | 9917084 A1 | 4/1999 |
| WO | 02066934 | 8/2002 |
| WO | 03021425 A2 | 3/2003 |

* cited by examiner

METER ELECTRONICS AND METHODS FOR GENERATING A DRIVE SIGNAL FOR A VIBRATORY FLOWMETER

The present application claims the benefit of the parent U.S. patent application Ser. No. 12/066,910, entitled "Meter Electronics and Methods for Generating a Drive Signal for a Vibratory Flowmeter", filed on Mar. 14, 2008, now U.S. Pat. No. 7,983,855, claims benefit of the PCT patent application PCT/US06/35706, entitled "Meter Electronics and Methods for Generating a Drive Signal for a Vibratory Flowmeter", filed on Sep. 13, 2006, and further claims the benefit of U.S. Provisional Patent Application No. 60/718,941, entitled "Meter Electronics and Methods for Generating a Drive Signal for a Vibratory Flowmeter", filed on Sep. 20, 2005.

BACKGROUND OF THE INVENTION

Field of the Invention

The present invention relates to a vibratory flowmeter, and more particularly, to meter electronics and methods for generating a drive signal for a vibratory flowmeter.

STATEMENT OF THE PROBLEM

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

In addition to generating flow measurements, a flowmeter's electronics must also generate a drive signal. The drive signal should optimally drive the vibration of the flowmeter at or near a frequency that enables accurate flow characteristics measurements. In addition, the drive signal should enable fast and reliable startup of the vibration. Furthermore, the drive signal should enable accurate and timely diagnostic operations of the flowmeter.

SUMMARY OF THE SOLUTION

The above and other problems are solved and an advance in the art is achieved through the provision of a meter electronics and methods for generating a drive signal for a vibratory flowmeter.

A meter electronics for generating a drive signal for a vibratory flowmeter is provided according to an embodiment of the invention. The meter electronics comprises an interface for receiving a sensor signal from the vibratory flowmeter and a processing system in communication with the interface. The processing system is configured to receive the sensor signal, phase-shift the sensor signal substantially 90 degrees to create a phase-shifted sensor signal, determine a phase shift value ($\theta$) from a frequency response of the vibratory flowmeter, and combine the phase shift value ($\theta$) with the sensor signal and the phase-shifted sensor signal in order to generate a drive signal. The processing system is further configured to determine a sensor signal amplitude from the sensor signal and the phase-shifted sensor signal and generate a drive signal amplitude based on the sensor signal amplitude. The drive signal phase is substantially identical to a sensor signal phase.

A method for generating a drive signal for a vibratory flowmeter is provided according to an embodiment of the invention. The method comprises receiving a sensor signal from the vibratory flowmeter. The method further comprises phase-shifting the sensor signal substantially 90 degrees to create a phase-shifted sensor signal, determining a sensor signal amplitude from the sensor signal and the phase-shifted sensor signal, and generating a drive signal amplitude based on the sensor signal amplitude. The method further comprises generating a drive signal including the drive signal amplitude.

A method for generating a drive signal for a vibratory flowmeter is provided according to an embodiment of the invention. The method comprises receiving a sensor signal from the vibratory flowmeter, phase-shifting the sensor signal substantially 90 degrees to create a phase-shifted sensor signal, and determining a phase shift value ($\theta$) from a frequency response of the vibratory flowmeter. The method further comprises combining the phase shift value ($\theta$) with the sensor signal and the phase-shifted sensor signal in order to generate a drive signal. The drive signal phase is substantially identical to a sensor signal phase.

A method for generating a drive signal for a vibratory flowmeter is provided according to an embodiment of the invention. The method comprises receiving a sensor signal from the vibratory flowmeter, phase-shifting the sensor signal substantially 90 degrees to create a phase-shifted sensor signal, determining a phase shift value ($\theta$) from a frequency response of the vibratory flowmeter, and combining the phase shift value ($\theta$) with the sensor signal and the phase-shifted sensor signal in order to generate a drive signal. The method further comprises determining a sensor signal amplitude from the sensor signal and the phase-shifted sensor signal and generating a drive signal amplitude based on the sensor signal amplitude. The drive signal phase is substantially identical to a sensor signal phase.

ASPECTS OF THE INVENTION

In one aspect of the meter electronics, the phase-shifting is performed by a Hilbert transform.

In another aspect of the meter electronics, the phase shift value ($\theta$) comprises a compensation value.

In yet another aspect of the meter electronics, determining the phase shift value ($\theta$) comprises linearly correlating the frequency response to a frequency/phase relationship in order to produce the phase shift value (θ).

In yet another aspect of the meter electronics, determining the sensor signal amplitude comprises receiving an A cos ωt term representing the sensor signal, generating an A sin ωt term from the phase-shifting, squaring the A cos ωt term and the A sin ωt term, and taking a square root of the sum of the A cos ωt squared term and the A sin ωt squared term in order to determine the sensor signal amplitude.

In yet another aspect of the meter electronics, generating the drive signal amplitude further comprises comparing the sensor signal amplitude to an amplitude target and scaling the sensor signal amplitude in order to generate the drive signal amplitude, with the scaling being based on the comparing of the sensor signal amplitude to the amplitude target.

In yet another aspect of the meter electronics, the processing system is further configured to chirp the drive signal at a startup of the flowmeter.

In yet another aspect of the meter electronics, the processing system is further configured to chirp the drive signal at a startup of the flowmeter, with the chirping comprising sweeping through two or more frequency ranges until the flowmeter starts.

In yet another aspect of the meter electronics, the processing system is further configured to linearize the drive signal.

In yet another aspect of the meter electronics, the processing system is further configured to calculate a second amplitude using peak detection, compare the sensor signal amplitude to the second amplitude, and detect broadband noise on a pickoff sensor if the second amplitude is higher than the sensor signal amplitude.

In one aspect of the method, the phase-shifting is performed by a Hilbert transform.

In yet another aspect of the method, the method further comprises determining a sensor signal amplitude from the sensor signal and the phase-shifted sensor signal, generating a drive signal amplitude based on the sensor signal amplitude, and including the drive signal amplitude in the drive signal.

In another aspect of the method, determining the sensor signal amplitude comprises receiving an A cos ωt term representing the sensor signal, generating an A sin ωt term from the phase-shifting, squaring the A cos ωt term and the A sin ωt term, and taking a square root of the sum of the A cos ωt squared term and the A sin ωt squared term in order to determine the sensor signal amplitude.

In yet another aspect of the method, generating the drive signal amplitude further comprises comparing the sensor signal amplitude to an amplitude target and scaling the sensor signal amplitude in order to generate the drive signal amplitude, with the scaling being based on the comparing of the sensor signal amplitude to the amplitude target.

In yet another aspect of the method, the method further comprises receiving an A cos ωt term representing the sensor signal, generating an A sin ωt term from the phase-shifting, squaring the A cos ωt term and the A sin ωt term, taking a square root of the sum of the A cos ωt squared term and the A sin ωt squared term in order to determine the sensor signal amplitude, generating a drive signal amplitude based on the sensor signal amplitude, and including the drive signal amplitude in the drive signal.

In yet another aspect of the method, the method further comprises receiving an A cos ωt term representing the sensor signal, generating an A sin ωt term from the phase-shifting, squaring the A cos ωt term and the A sin ωt term, taking a square root of the sum of the A cos ωt squared term and the A sin ωt squared term in order to determine the sensor signal amplitude, comparing the sensor signal amplitude to an amplitude target, scaling the sensor signal amplitude in order to generate the drive signal amplitude, with the scaling being based on the comparing of the sensor signal amplitude to the amplitude target, and including the drive signal amplitude in the drive signal.

In yet another aspect of the method, the method further comprises determining a phase shift value (θ) from a frequency response of the vibratory flowmeter, combining the phase shift value (θ) with the sensor signal and the phase-shifted sensor signal in order to generate a drive signal phase, and including the drive signal phase in the drive signal, wherein the drive signal phase is substantially identical to a sensor signal phase.

In yet another aspect of the method, the phase shift value (θ) comprises a compensation value.

In yet another aspect of the method, determining the phase shift value (θ) comprises linearly correlating the frequency response to a frequency/phase relationship in order to produce the phase shift value (θ).

In yet another aspect of the method, the method further comprises linearly correlating the frequency response to a frequency/phase relationship in order to produce a phase shift value (θ), combining the phase shift value (θ) with the sensor signal and the phase-shifted sensor signal in order to generate a drive signal phase, and including the drive signal phase in the drive signal, wherein the drive signal phase is substantially identical to a sensor signal phase.

In yet another aspect of the method, the method further comprises chirping the drive signal at a startup of the flowmeter.

In yet another aspect of the method, the method further comprises chirping the drive signal at a startup of the flowmeter, with the chirping comprising sweeping through two or more frequency ranges until the flowmeter starts.

In yet another aspect of the method, the method further comprises linearizing the drive signal.

In yet another aspect of the method, the method further comprises calculating a second amplitude using peak detection, comparing the sensor signal amplitude to the second amplitude, and detecting broadband noise on a pickoff sensor if the second amplitude is higher than the sensor signal amplitude.

DESCRIPTION OF THE DRAWINGS

The same reference number represents the same element on all drawings.

DETAILED DESCRIPTION OF THE INVENTION

FIGS. 1-20 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
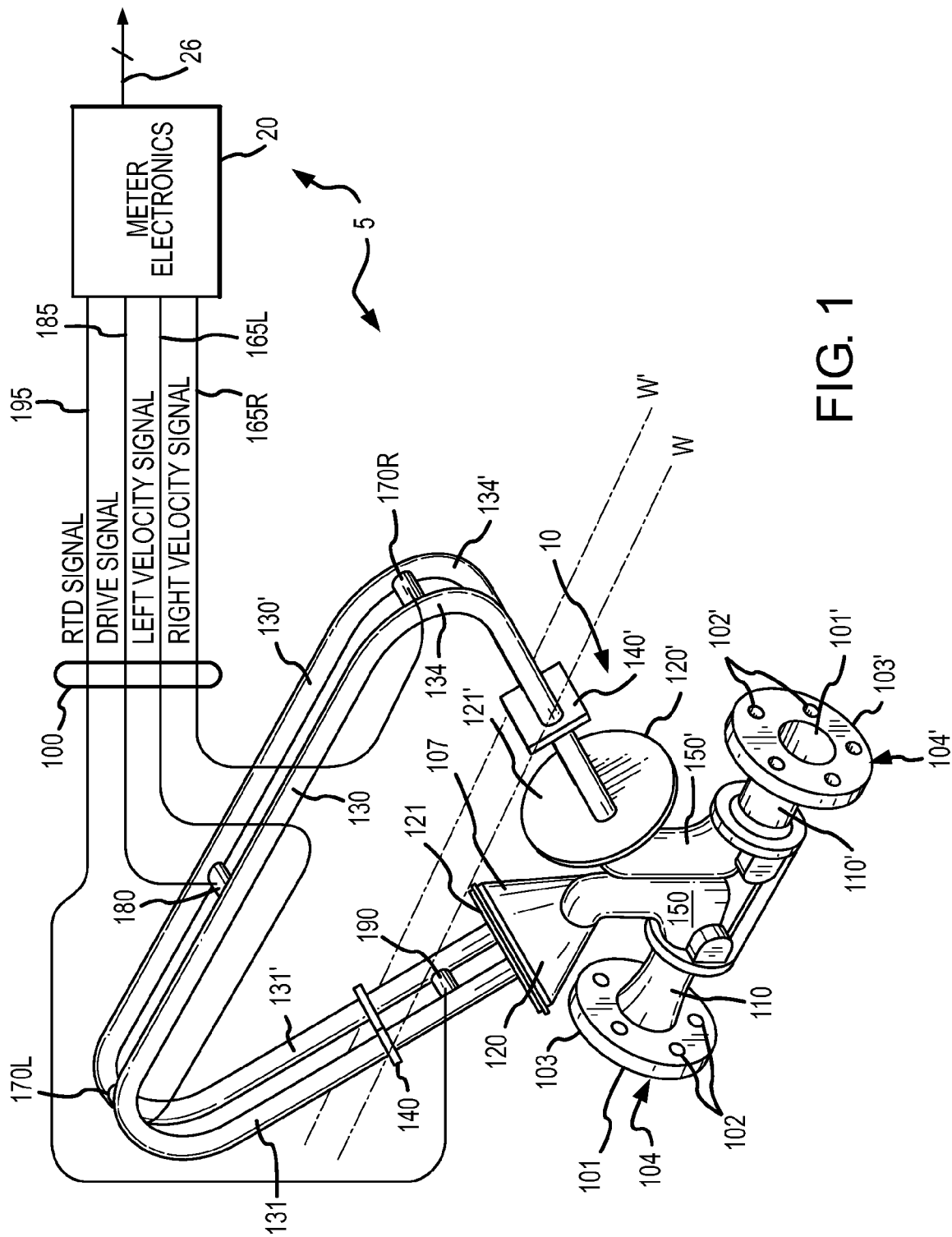
FIG. 1 shows a Coriolis flow meter comprising a meter assembly and meter electronics.

FIG. 1 shows a Coriolis flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' in what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

Figure 2:
FIG. 2 shows meter electronics according to an embodiment of the invention.

FIG. 2 shows meter electronics 20 according to an embodiment of the invention. The meter electronics 20 can include an interface 201 and a processing system 203. The meter electronics 20 receives first and second sensor signals from the meter assembly 10, such as pickoff/velocity sensor signals. The meter electronics 20 can operate as a mass flow meter or can operate as a densitometer, including operating as a Coriolis flow meter. The meter electronics 20 processes the first and second sensor signals in order to obtain flow characteristics of the flow material flowing through the meter assembly 10. For example, the meter electronics 20 can determine one or more of a phase difference, a frequency, a time difference (Δt), a density, a mass flow rate, and a volume flow rate from the sensor signals, for example. In addition, the meter electronics 20 can generate a drive signal and supply the drive signal to the driver 180 of the meter assembly 10 (see FIG. 1). Furthermore, other flow characteristics can be determined according to the invention. The determinations are discussed below.

The interface 201 receives the sensor signal from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer (not shown), wherein the sensor signal comprises an analog sensor signal. The digitizer samples and digitizes the analog sensor signal and produces a digital sensor signal. The digitizer can also perform any needed decimation, wherein the digital sensor signal is decimated in order to reduce the amount of signal processing needed and to reduce the processing time.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate a drive signal, among other things. The drive signal is supplied to the driver 180 in order to vibrate the associated flow tube or tubes, such as the flow tubes 130 and 130' of FIG. 1.

In the embodiment shown, the processing system 203 determines the drive signal from the sensor signal 210 and from a ninety degree phase shift 211 that is produced from the sensor signal 210. The processing system 203 can determine at least the drive signal phase angle and the drive signal amplitude from the sensor signal 210 and the phase shift 213. As a result, either a first or second phase shifted sensor signal (such as one of the upstream or downstream pickoff signals), or a combination of the two, can be processed by the processing system 203 according to the invention in order to generate the drive signal.

The storage system 204 can store flow meter parameters and data, software routines, constant values, and variable values. In one embodiment, the storage system 204 includes routines that are executed by the processing system 203. In one embodiment, the storage system 204 stores a phase shift routine 220, a signal conditioning routine 221, a phase angle routine 222, and an amplitude routine 223, among other routines.

In one embodiment, the storage system 204 stores data and variables used to operate a flow meter, such as the Coriolis flow meter 5. The storage system 204 in one embodiment stores variables such as the sensor signal 210, which is received from one of the velocity/pickoff sensors 170L and 170R, and stores a 90 degree phase shift 211 that is generated from the sensor signal 210. In addition, the storage system 204 can store a sensor signal phase 212, a drive signal phase 213, a sensor signal amplitude 214, a drive signal amplitude 215, and an amplitude target 216.

The phase shift routine 220 performs a 90 degree phase shift on an input signal, i.e., on the sensor signal 210. The phase shift routine 220 in one embodiment implements a Hilbert transform (discussed below). The phase shift routine 220 can generate the 90 degree phase shift 211.

The signal conditioning routine 221 performs signal conditioning on the sensor signal 210. The signal conditioning can include any manner of filtering, decimation, etc. The signal conditioning routine 221 is an optional routine.

The phase angle routine 222 determines the sensor signal phase 212 of the sensor signal 210. In addition, the phase angle routine 222 determines a drive signal phase 213, wherein the drive signal phase 213 is substantially identical to the sensor signal phase 212. The phase angle routine 222 may therefore add or subtract a phase shift value ($\theta$) to the sensor signal 210 in order to match the phase of the sensor signal 210.

The amplitude routine 223 determines the sensor signal amplitude 214 from the sensor signal 210. In addition, the amplitude routine 223 determines the drive signal amplitude 215, wherein the drive signal amplitude 215 is based on the sensor signal amplitude 214. The drive signal amplitude 215 may be greater or less than the sensor signal amplitude 214. In one embodiment, the sensor signal amplitude 214 is compared to the amplitude target 216 in order to determine the amount that the drive signal amplitude 215 should be scaled up or down. Therefore, the amplitude routine 223 determines the drive signal amplitude 215 for the drive signal.

The sensor signal phase 212 is a measured or calculated phase angle of the sensor signal 210. The sensor signal phase 212 is determined in order to set a proper, matching drive signal phase 213. The drive signal phase 213 therefore is substantially identical to the sensor signal phase 212.

The sensor signal amplitude 214 is a measured or calculated amplitude of the sensor signal 210. The sensor signal amplitude is determined in order to determine the drive signal amplitude 215. The drive signal amplitude 215 is based on the sensor signal amplitude 214, although the drive signal amplitude 215 can deviate from the sensor signal amplitude 214.

The amplitude target 216 is a desired vibratory sensor amplitude for normal or preferred operation of the flow meter 5. In one embodiment, the amplitude target 216 comprises a minimum amplitude threshold, wherein the sensor signal amplitude 214 will be scaled up by the processing system 202 if the sensor signal amplitude 214 does not exceed the amplitude target 216. Therefore, the drive signal amplitude 215 may be made greater than the sensor signal amplitude 214 if sensor signal amplitude 214 does not exceed this minimum amplitude threshold. Alternatively, the amplitude target 216 can comprise an amplitude range, wherein the drive signal amplitude 215 comprises a scaled-up or scaled-down version of the sensor signal amplitude 214.

Figure 3:
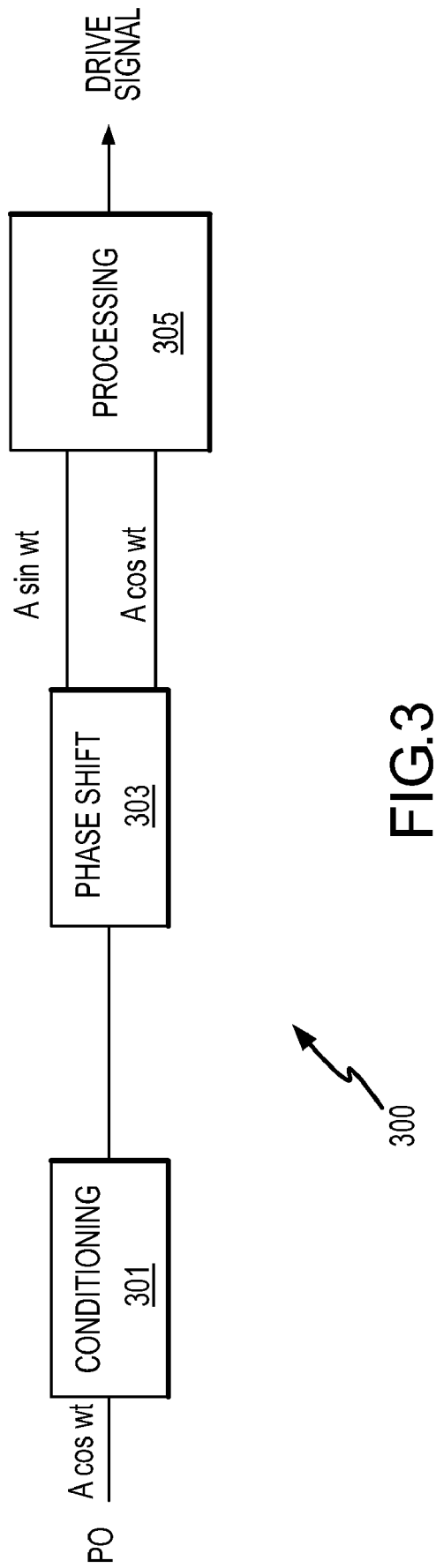
FIG. 3 shows a drive signal portion of the meter electronics according to an embodiment of the invention.

FIG. 3 shows a drive signal portion 300 of the meter electronics 20 according to an embodiment of the invention. The drive signal portion 300 can comprise circuit components or can comprise processing actions performed on data received by the meter electronics 20.

The drive signal portion 300 can include a conditioning block 301, a phase shift block 303, and a processing block 305, among other things. A sensor signal is received in the conditioning block 301. The sensor signal can comprise either pickoff signal 170L or 170R of the meter assembly 10 or a combination of the two signals. The conditioning block 301 can perform any manner of signal conditioning. For example, the conditioning block 301 can perform filtering, decimating, etc.

The phase shift block 303 receives the sensor signal from the conditioning block 301 and phase shifts the sensor signal by substantially 90 degrees. The shifted sensor signal comprises an un-shifted component represented by an (A cos ωt) term and a phase shifted component represented by an (A sin ωt) term, where w is the sensor frequency in radians (see equation 2, below).

In one embodiment, the phase shift block 303 comprises a Hilbert transform. The Hilbert transform performs the phase-shifting operation by delaying the sensor signal by a time equivalent to 90 degrees (or one quarter of the wave period).

The processing block 305 receives the sensor signal and the phase-shifted sensor signal and generates a drive signal from these two inputs. The processing block 305 can generate a drive signal output equal to an ($A_{out}$ cos(ωt+θ)) term (see equation 3, below). The phase shift value (θ) determines the phase matching and the amplitude $A_{out}$ comprises the drive signal amplitude. The processing block 305 therefore can determine both the drive signal amplitude and the drive signal phase, wherein the processing block 205 substantially maintains the frequency of the sensor signal at the drive signal frequency. Advantageously, the processing block 305 substantially locks the phase of the drive signal to the phase of the sensor signal. This is made possible by the phase-shifting operation, wherein the phase angle of the sensor signal can be easily and rapidly determined. As a result, the drive signal phase angle can very closely track the phase angle of the sensor signal, wherein the drive signal is maintained in a substantially linear relationship with the sensor signal. This enables the meter electronics 20 to more accurately drive the flow meter and enables the meter electronics 20 to rapidly adjust the drive signal in conditions of non-uniform flow, such as multi-phase flows, empty-full-empty batching, flow materials including entrained air, etc.

The processing block 305 can determine the sensor signal phase angle and can control the drive signal in order to substantially align the drive signal phase to the sensor signal phase. This is done without any feedback from the phase of the sensor signal. As a result, the frequency of the drive signal substantially tracks the frequency of the sensor signal, with no need to control the drive signal frequency. Because the drive signal amplitude and phase are rapidly determined, the invention enables a flowmeter to be driven very close to a resonance frequency, wherein changes to the resonance frequency are substantially instantaneously tracked. As a result, the drive signal responds faster to changing flow conditions. This also enables implementation of various flowmeter diagnostics. For example, the drive signal can be rapidly changed in order to assess a Flow Calibration Factor (FCF), determine flowtube stiffness, detect flowtube corrosion/erosion, detect cracks or flaws in a flowtube, determine a flow material coating amount on the inside of a flowtube, etc.

The processing block 305 can determine the sensor signal amplitude and can generate a drive signal amplitude based on the sensor signal amplitude. The processing block 305 can compare the sensor signal amplitude to an amplitude target (such as an amplitude setpoint or an amplitude operating range, for example) and can scale the drive signal up or down as needed.

The sensor signal (or pickoff signal, PO) can be represented by the equation:

$$PO = A_{in} \cos \omega t \qquad (1)$$

Where the cos ωt term denotes the time varying nature of the sensor signal and the $A_{in}$ term represents the amplitude of the sensor signal. The phase-shifted output (PSO) of the phase shift block can be represented by the equation:

$$PSO = A_{in} \sin \omega t \qquad (2)$$

where the ($A_{in}$ sin ωt) term represents the phase-shifted version of the sensor signal. Using this output, the processing block 305 can generate a drive signal output that includes a phase delay adjustment term θ, where the phase delay adjustment term θ is adds to or subtracts from the sensor signal PO. As a result, the drive signal comprises:

$$\text{Drive signal} = A_{out} \cos(\omega t + \theta) = A_{out} [\cos(\omega t)\cos(\theta) - \sin(\omega t)\sin(\theta)] \qquad (3)$$

By proper selection of a θ value, the ωt+θ in the ($A_{out}$ cos(ωt+θ)) term can substantially match the sensor phase.

The drive signal amplitude $A_{out}$ can be derived from equation (2), where the sensor signal amplitude $A_{in}$ can be determined from the equation:

$$A_{in} = \sqrt{A_{in}^2 \sin(\omega t)^2 + A_{in}^2 \cos(\omega t)^2} \qquad (4)$$

The sensor signal amplitude $A_{in}$ can be scaled up or down in order to generate the drive signal amplitude $A_{out}$.

Figure 4:
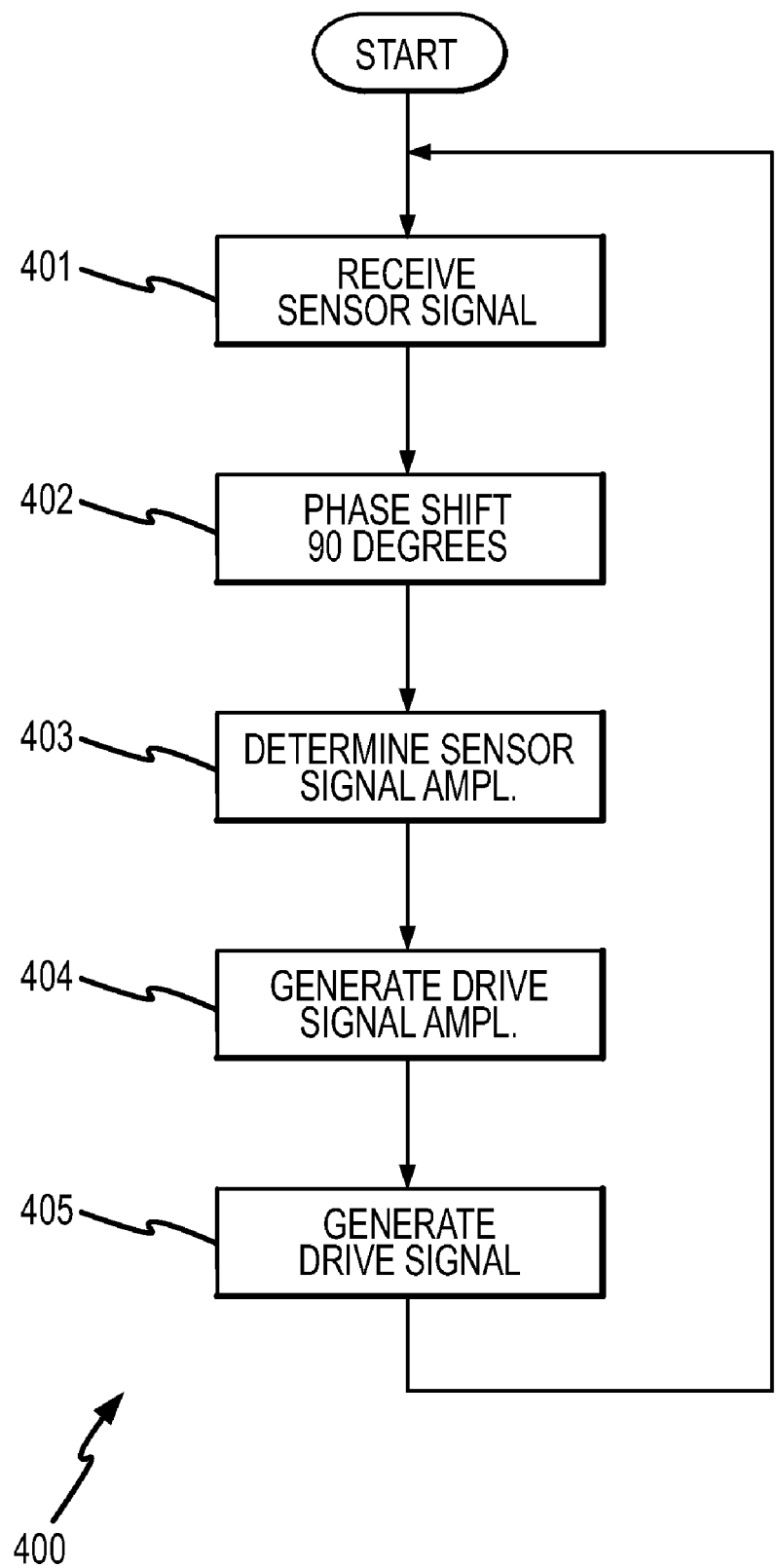
FIG. 4 is a flowchart of a method for generating a drive signal for a vibratory flowmeter according to an embodiment of the invention.

FIG. 4 is a flowchart 400 of a method for generating a drive signal for a vibratory flowmeter according to an embodiment of the invention. In step 401, a sensor signal is received. The sensor signal can comprise an output of a pickoff sensor that generates a time-varying electronic signal in response to vibration of one or more flow tubes of the flow meter.

In step 402, the received sensor signal is phase-shifted by about 90 degrees. In one embodiment, the phase-shifting operation is performed using a Hilbert transform, for example. However, it should be understood that other phase-shifting methods can also be employed. The phase-shifting operation can generate an A sin ωt term, in addition to the A cos ωt term that represents the sensor signal.

In step 403, a sensor signal amplitude is determined from the sensor signal and the 90 degree phase shift, i.e., using the ($A_{in}$ sin ωt) term and the ($A_{in}$ cos ωt) term (see equation 4).

In step 404, the sensor signal amplitude is used to generate a drive signal amplitude. The drive signal amplitude is based on the sensor signal amplitude. However, the drive signal amplitude can be scaled up or down relative to the sensor signal amplitude. The scaling in some embodiments is constrained, and the scaling can be limited by upper and/or lower scaling boundaries.

In step 405, the drive signal amplitude is included in the drive signal. Consequently, the method 400 generates a fast and accurate amplitude for the drive signal.

The above method can be iteratively and/or substantially continuously performed in order to substantially continuously generate the drive signal amplitude. The drive signal amplitude can be rapidly determined, wherein the drive signal amplitude is substantially instantaneously generated.

Figure 5:
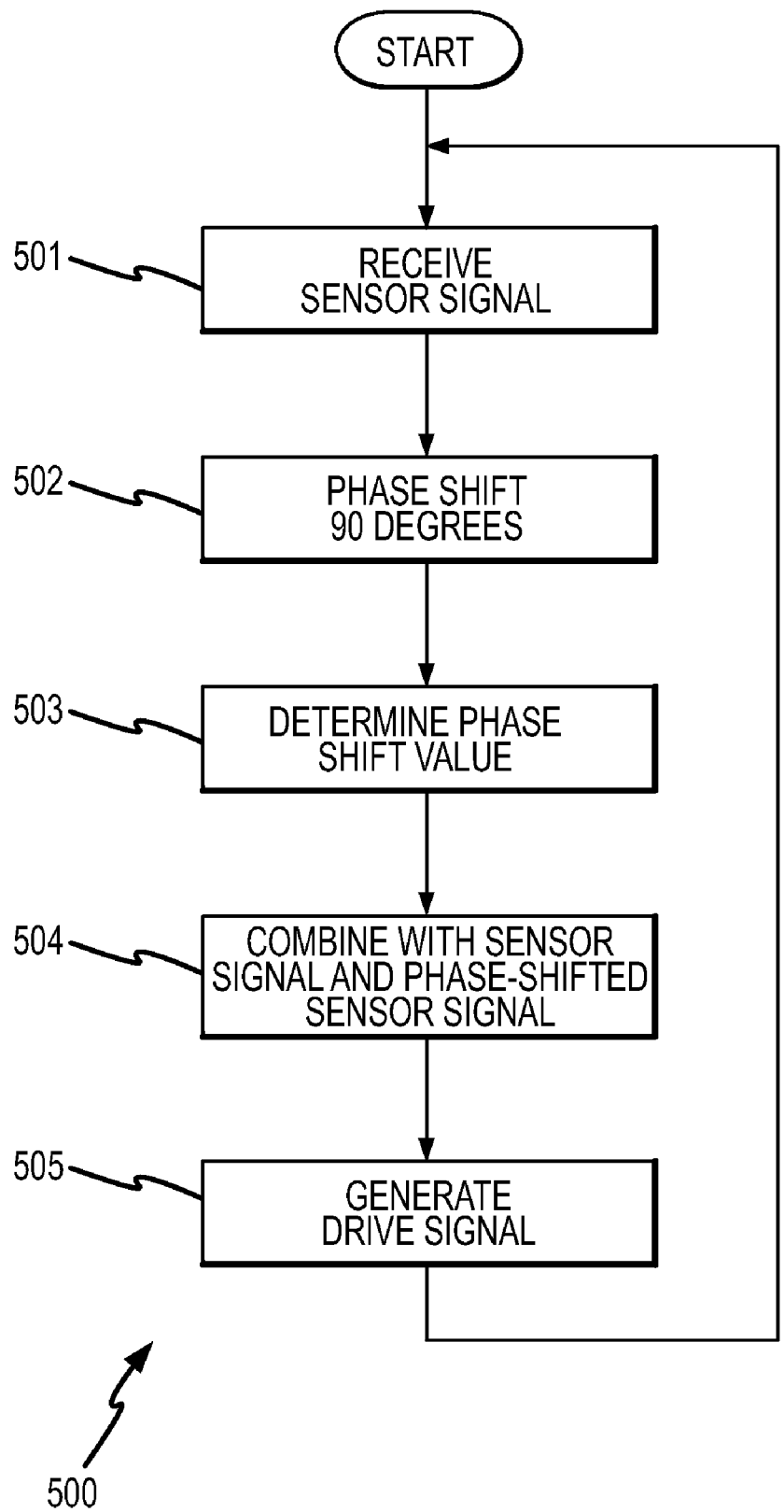
FIG. 5 is a flowchart of a method for generating a drive signal for a vibratory flowmeter according to an embodiment of the invention.

FIG. 5 is a flowchart 500 of a method for generating a drive signal for a vibratory flowmeter according to an embodiment of the invention. In step 501, a sensor signal is received, as previously discussed.

In step 502, the received sensor signal is phase-shifted by substantially 90 degrees, as previously discussed.

In step 503, a phase shift value (θ) is determined from a frequency response of the vibratory flowmeter. The phase shift value (θ) can comprise a compensation value, such as phase advance value (i.e., +θ) or a phase delay value (i.e., −θ). The phase shift value (θ) can be determined by correlating the frequency response to a frequency/phase relationship. In one embodiment, the frequency/phase relationship comprises an empirically obtained frequency-to-phase relationship. For example, several frequency-to-phase values can be obtained and stored, wherein the stored values are used to derive or interpolate a needed phase shift value (θ). Alternatively, the frequency/phase relationship comprises a theoretical relationship formed from predicted phase and frequency values.

In step 504, the phase shift value (θ) is combined with the sensor signal (the (A cos ωt) term) and the phase-shifted sensor signal (the (A sin ωt) term) in order to generate the drive signal phase.

In step 505, the drive signal amplitude is included in the drive signal. In this manner, the phase of the drive signal is substantially locked to the phase of the sensor signal.

The above method can be iteratively and/or substantially continuously performed in order to substantially continuously generate the drive signal phase, as previously discussed. The drive signal phase can be rapidly determined, wherein the drive signal phase is substantially instantaneously generated.

It should be understood that the method 400 and the method 500 can advantageously be combined in order to generate both a drive signal phase and a drive signal amplitude. The combined methods 400 and 500 in some embodiments generates a complete drive signal.

Figure 6:
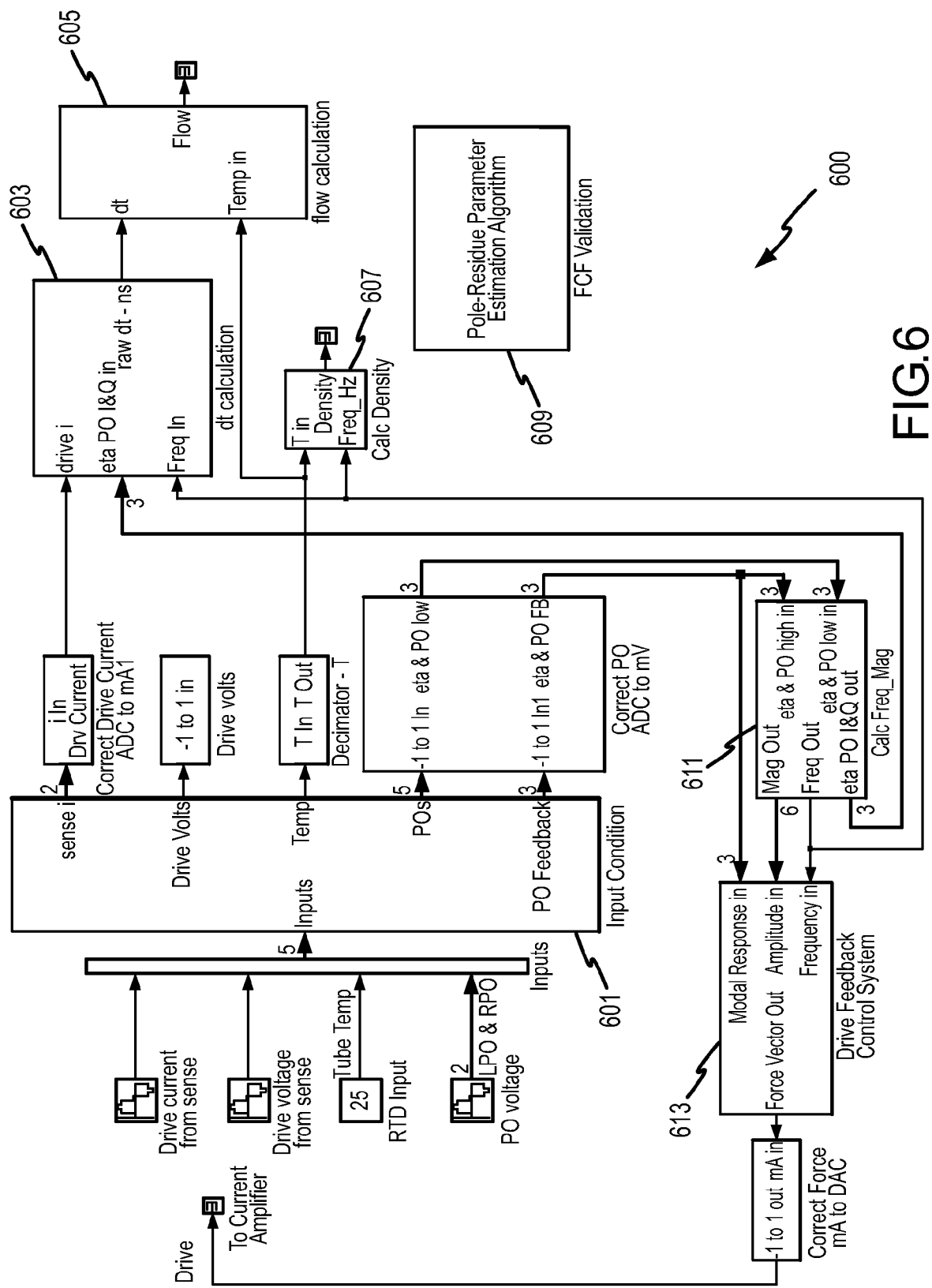
FIG. 6 is a block diagram of a closed loop digital drive according to an embodiment of the invention.

FIG. 6 is a block diagram of a closed loop digital drive 600 according to an embodiment of the invention. The block diagram represents the various functionalities that are incorporated into the processing system 203 in this embodiment.

A digital drive output to a driver amplifier hardware (amplifier not shown) is at the upper left side of the figure. The drive current and drive voltage are input from a sense board into the Input Condition block 601, along with the temperature from an RTD circuit and the two pickoff signals (LPO and RPO). The Input Condition block 601 can perform any manner of filtering and decimating.

The digital drive features are implemented mainly in two blocks, the Calc Freq_Mag block 611 and the Drive Feedback Control System block 613. The Calc Freq_Mag block 611 in the embodiment shown uses a Hilbert frequency estimator and can use a single or dual amplitude estimation arrangement. The Drive Feedback Control System block 613 generates a drive signal according to the invention.

The Input Condition block 601 can perform filtering in order to remove higher frequency components from the pickoff sensor signals to insure that the closed loop drive excites a fundamental bending mode of the vibratory flowmeter. In particular, the filtering can be designed to remove a second harmonic and also can remove a twist mode frequency from the sensor signals. This can be done with an adjustable lowpass filter. The filter cutoff frequency can be based on $K_1$, which is the tube period on air.

Figure 7:
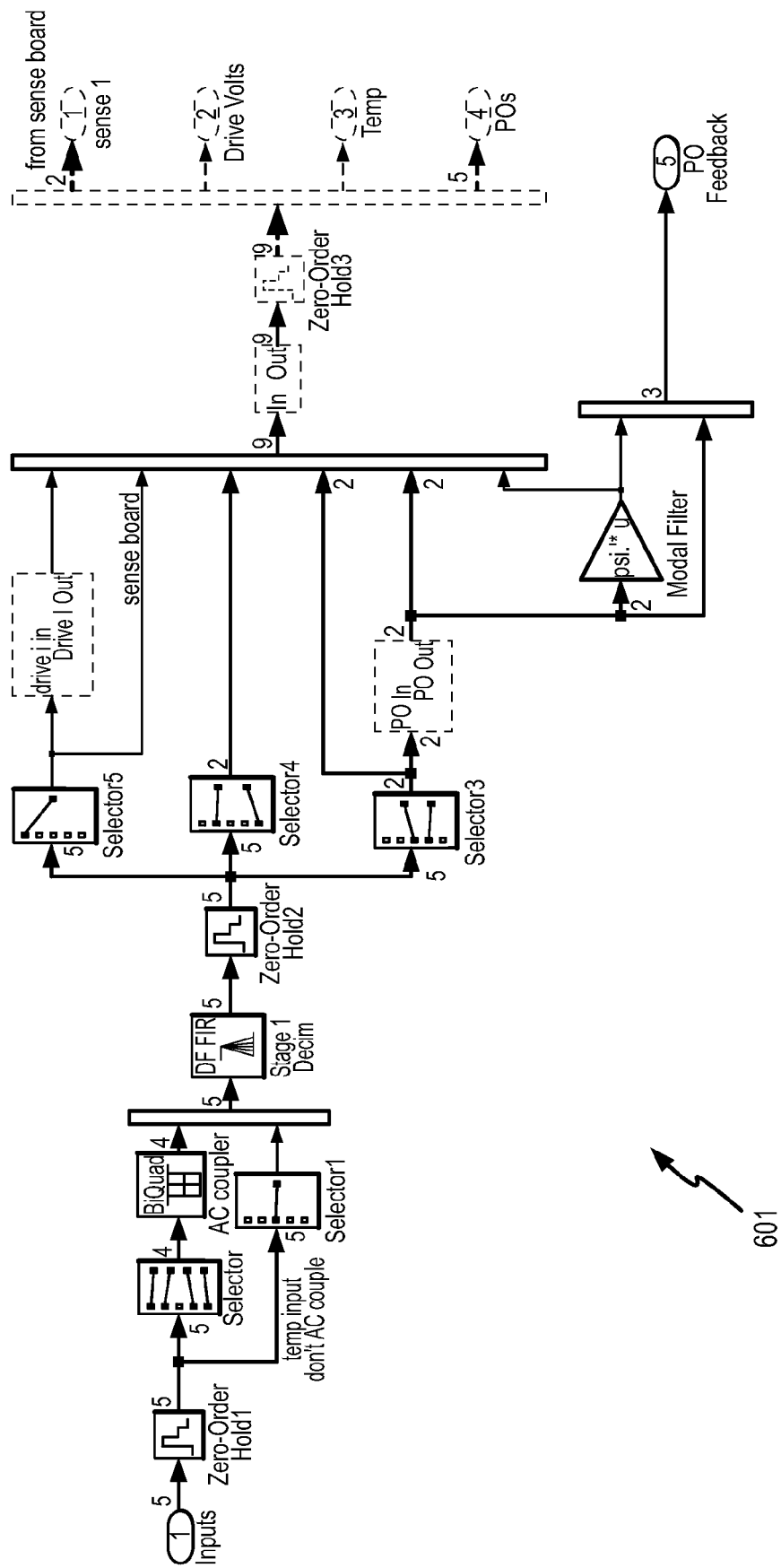
FIG. 7 shows an Input Condition block according to an embodiment of the invention.

FIG. 7 shows the Input Condition block 601 according to an embodiment of the invention. FIG. 7 additionally shows the location of the adjustable lowpass filter within the Input Condition block 601 and also shows the sampling rates used in various portions of the Input Condition block 601. The signals come in on the left at a base rate through the Stage 1 Decimation block. In one embodiment, the base rate is chosen to be about 48 kHz so that a coder/decoder (CODEC) is appropriately anti-aliased. The stage 1 decimation brings the rate down to about 4 kHz, and the 4 kHz rate is used until the Adjustable Low Pass Filter. Three 4 kHz pickoff feedback signals are passed out of the input condition block as the LPO and RPO signals, as well as the modal filtered PO signal (designated as η or eta), for drive feedback at the output port labeled PO Feedback on the right bottom of the figure. The modal filter can be developed using any method. In one embodiment, a simplified modal filter vector of {0.5; 0.5} can be used to create an average of the LPO and RPO signals, for example.

The pickoffs are passed out of the block at a 2 kHz sample rate after passing through the adjustable low pass filter. Both sets of pickoff signals can optionally be passed through a scaling block to convert them to millivolt levels. All signals are scaled to the appropriate fixed point values, which will be a familiar technique to one skilled in the art. The resulting pickoff signals at both rates are fed into the Calc Freq_Mag block 611.

Figure 8:
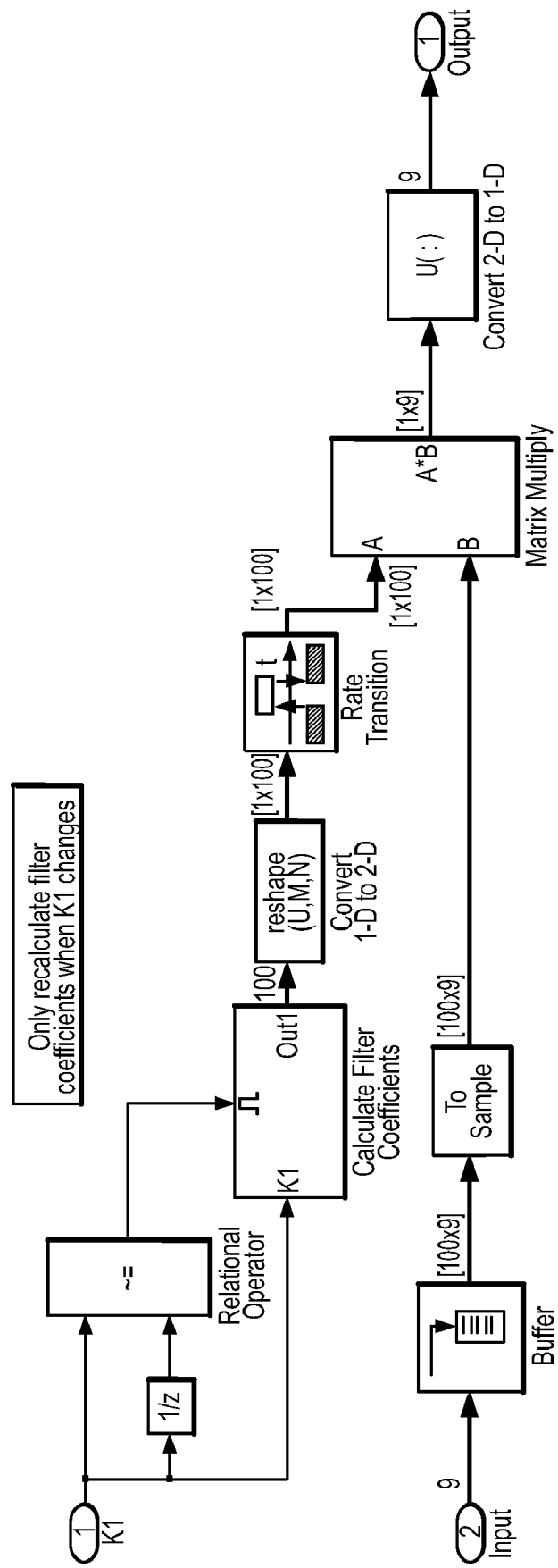
FIG. 8 shows an implementation of an adjustable ideal lowpass filter of order N=100 multiplied with a Hanning window to create a low-pass Finite Impulse Response (FIR) filter.

FIG. 8 shows an implementation of an adjustable ideal lowpass filter of order N=100 multiplied with a Hanning window to create a low-pass Finite Impulse Response (FIR) filter, shown at the right of FIG. 7. The dot-product of the filter coefficients and the N buffered samples is taken to produce the low pass filtered output. The filter coefficients are recalculated in the enabled subsystem to give the appropriate cutoff frequency whenever $K_1$ changes.

Figure 9:
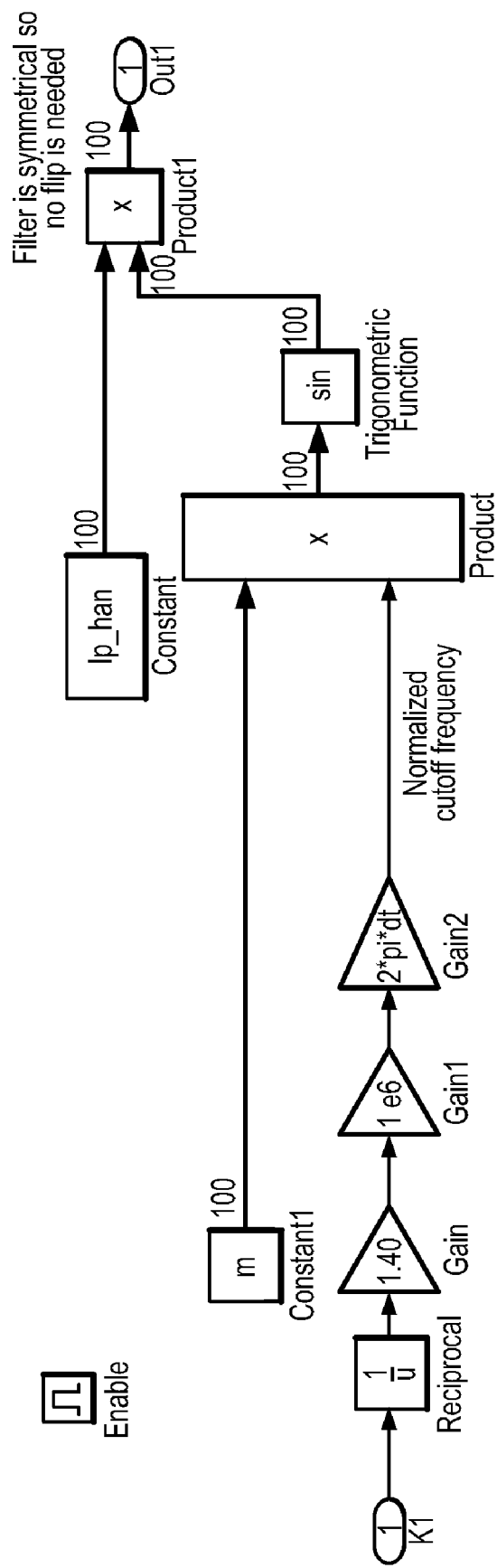
FIG. 9 shows an enabled subsystem to calculate the filter coefficients for the filter of FIG. 8.

FIG. 9 shows the enabled subsystem to calculate the filter coefficients for the filter of FIG. 8. The normalized cutoff frequency is calculated from $K_1$, which is the tube period in microseconds on air, by the lowest signal chain. The tube frequency will always be equal to or less than the air frequency, so $K_1$ is a good choice of parameters to pick for adjusting the low pass filter. In one embodiment, 20 Hz plus the air frequency corresponding to $K_1$ is used as the cutoff frequency. Alternatively, the cutoff frequency can be adjusted dynamically based upon the drive frequency. The gain of the filter starts to fall off before the cutoff frequency, so the 20 Hz factor gives a margin such that the filter gain at the air frequency is 1.

To insure startup of all sensors, the default $K_1$ value is such that it is at the highest frequency of any sensor it might be connected to. This way if the user fails to put in the proper $K_1$ value for the actual sensor, the sensor will still start.

Figure 10:
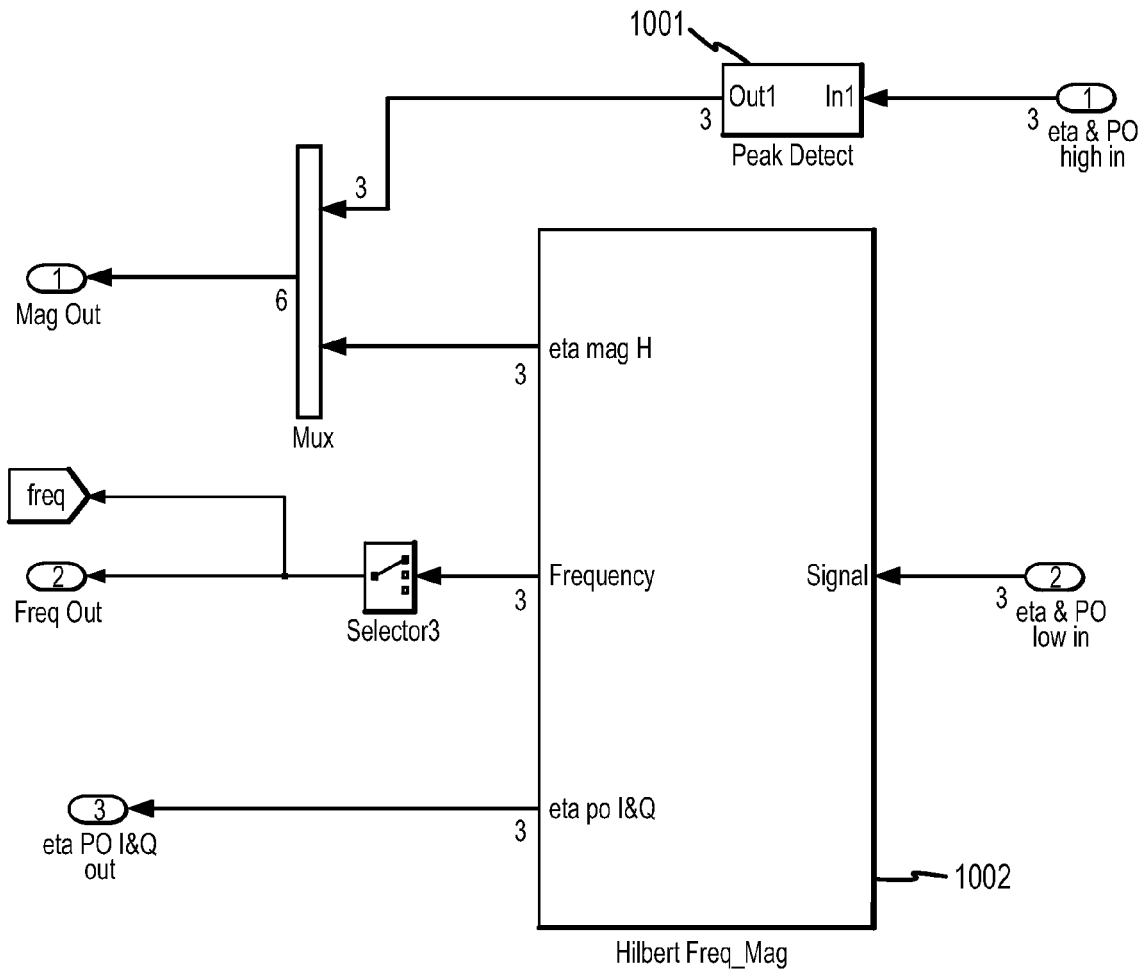
FIG. 10 shows a Calc Freq-Mag block according to an embodiment of the invention.

FIG. 10 shows the Calc Freq-Mag block 611 according to an embodiment of the invention. The two sets of pickoff signals (i.e, the "eta and PO high in" and the "eta and PO low in" inputs) are used to calculate two independent sets of amplitudes. The top Peak Detect block 1001 on the 4 kHz signals can be used to calculate the signal amplitudes based on a peak detector, for example. The lower, Hilbert Freq_Mag block 1002 uses a Hilbert signal processing approach on the 2 kHz signals to calculate an amplitude estimate that is more correlated to the sinusoidal amplitude at the drive frequency. Either amplitude computation can be selected and output by the multiplexer (MUX).

This two pronged amplitude approach allows the meter electronics 20 to react to noisy pickoff signals. If the peak detect amplitude is similar to the Hilbert amplitude, then the noise level is acceptable. If the peak detect is higher than the Hilbert amplitude, then there is broad band noise present on the pickoff sensor signals. In this case, the meter electronics 20 can decide which amplitude signal to utilize, can set a warning flag or error condition, and/or can rescale any preamp gain values.

Figure 11:
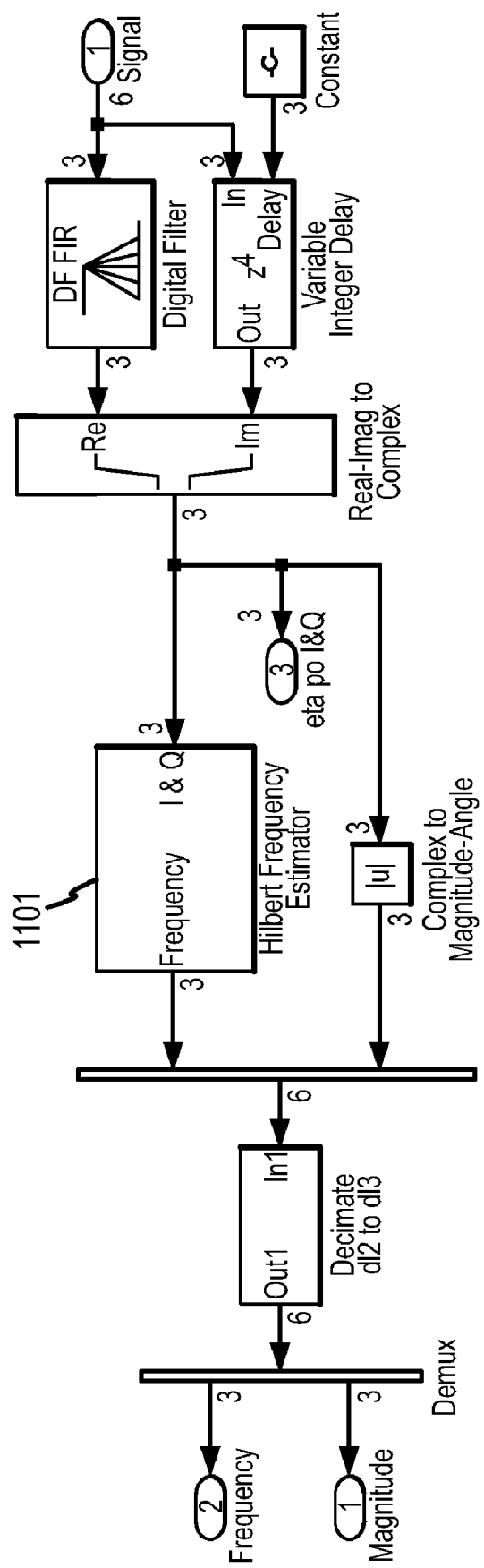
FIG. 11 shows a Hilbert Freq_Mag block according to an embodiment of the invention.

FIG. 11 shows the Hilbert Freq_Mag block 1002 according to an embodiment of the invention. A Hilbert transformation shifts the input signal 90 degrees in phase. The digital filter block at the top right of the figure implements the Hilbert filter. The output of the digital filter block is the phase shifted input signal (i.e., the Re signal). The variable integer delay block shifts the unfiltered signal by one-half the order of the FIR Hilbert filter. The result is two signals, the unfiltered delayed input signal (the In-phase component Im) and the input signal shifted 90 degrees (the quadrature component Re), with a delay due to the FIR Hilbert filter. The two signals are then combined into a complex number. The magnitude of the complex number is the sinusoidal amplitude, which is the quantity of interest for drive control. The frequency can also be calculated from the complex number, and is detailed below. Note that the magnitude and frequency, as well as the quadrature terms of all three signals LPO, RPO, and η, are calculated. The frequency and magnitude signals can be decimated to a lower rate as needed, typically down to about 500 Hz, for use in the drive control. The frequency is additionally used for the density and flow calculations.

Figure 12:
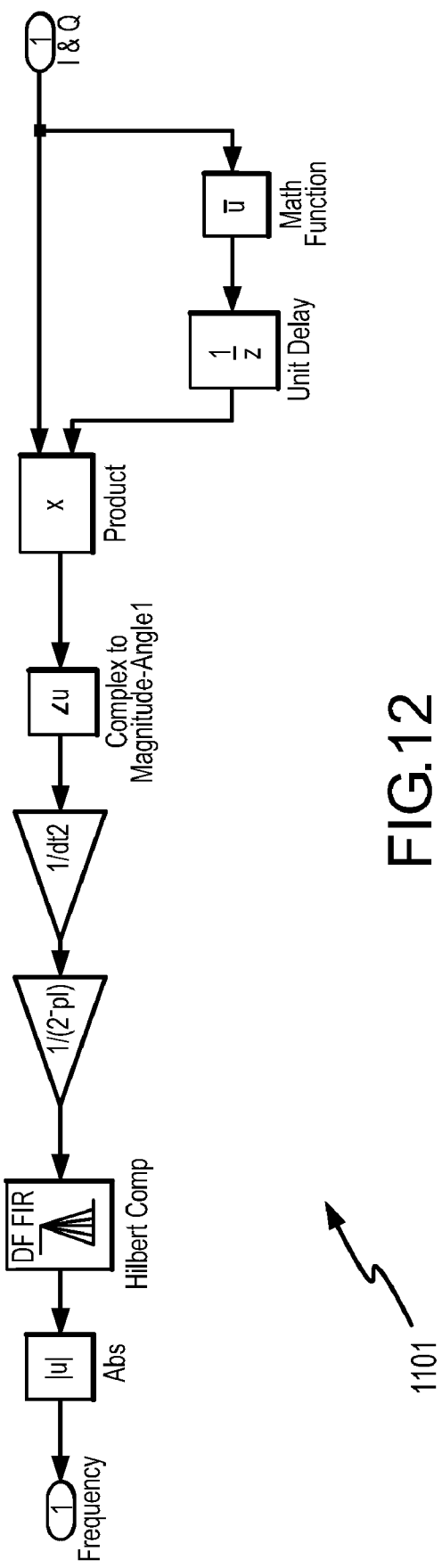
FIG. 12 shows a Hilbert Frequency Estimator block according to an embodiment of the invention.

FIG. 12 shows the Hilbert Frequency Estimator block 1101 according to an embodiment of the invention. In the Hilbert Frequency Estimator block 1101, the I and Q signals are received from the right. The signal is delayed by one sample and its complex conjugate is taken. The dot product of the original complex number and the time delayed conjugate results in a complex number whose angle is the angle between the two vectors. The angle between the two vectors was swept out over the sample time dt. Dividing the angle by the sample time (and $2\pi$) gives the frequency.

$$\phi = \omega T \quad (9)$$

$$\omega = \frac{\phi}{T} \quad (10)$$

$$f = \frac{\omega}{2\pi} \quad (11)$$

The Hilbert compensation filter is used to smooth out the frequency estimate. The absolute value of the frequency is taken, since the angle function may return a negative number. For the signal processing of the Hilbert Frequency Estimator block 1101 (and also the Hilbert Freq_Mag block 1002), the digital drive 600 may use either the RPO or LPO frequencies.

Referring again to FIG. 6, the eta I and Q signals go to the flow measurement, and the frequency goes to both the flow and density measurements, as discussed above. The frequency and magnitude, at the lower rate, and the feedback signal, at the 4 kHz rate are fed into the Drive Feedback Control System block 613.

Figure 13:
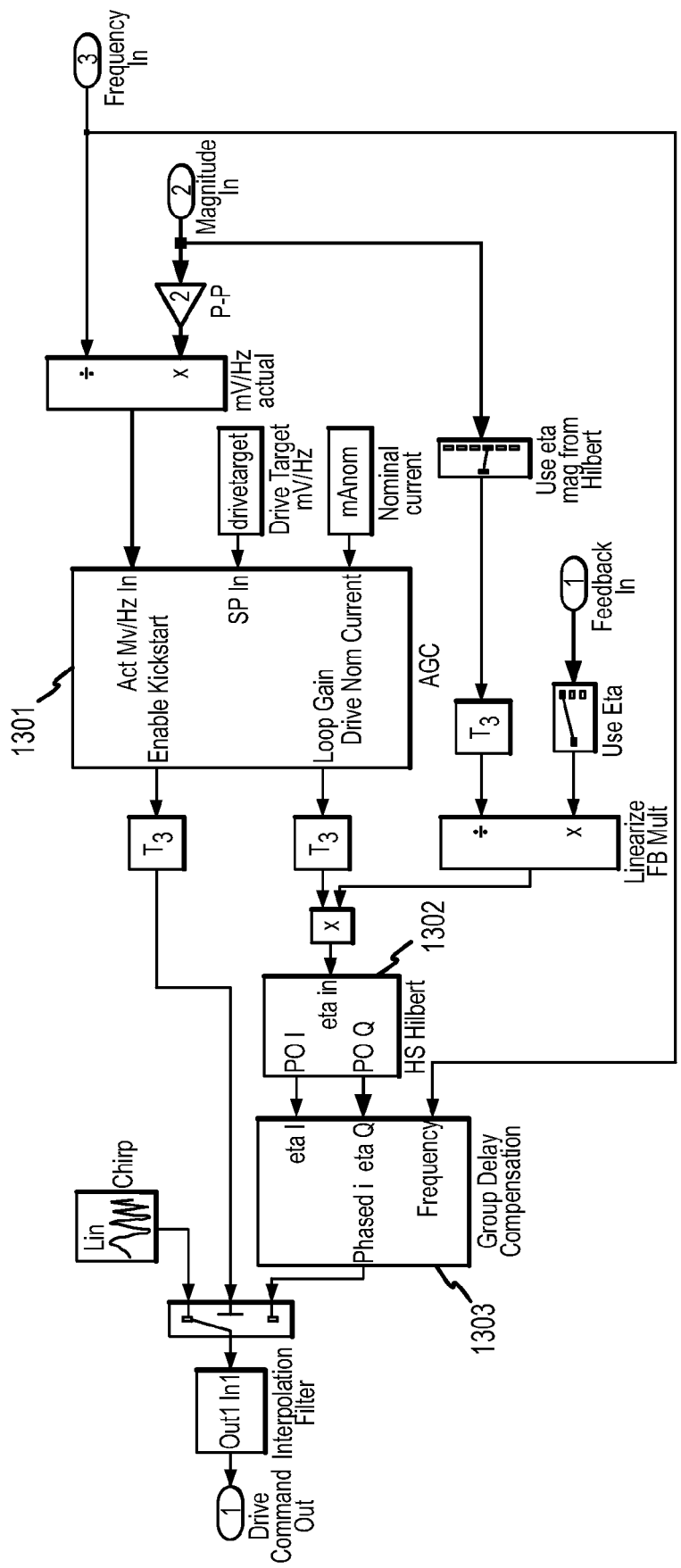
FIG. 13 shows a Drive Feedback Control System block according to an embodiment of the invention.

FIG. 13 shows the Drive Feedback Control System block 613 according to an embodiment of the invention. It should be noted that the Drive Feedback Control System block 613 can include more than one sampling rate. In the embodiment shown, there are 3 rates that are employed in the Drive Feedback Control System block 613. In the embodiment shown, the three rates are the 500 Hz rate for the frequency and magnitude estimation, the 4 kHz rate for the feedback signal, and the output rate of 8 kHz.

There are three inputs into the AGC block 1301. The frequency and magnitude estimates are used to calculate the actual peak-to-peak milliVolts/Hz, which are the units for the amplitude. The second input is the drive target, or setpoint, mV/Hz. The final input is the nominal current input.

The AGC block 1301 has 2 outputs. The first output is the Enable Kickstart output, discussed below. The second output is the Loop Gain output, which multiplies the feedback to produce the drive signal. The drive feedback leg selects η, the modally filtered pickoff signals, from the three possible choices (LPO, RPO, and η). The term η is a sinusoidal signal at the closed loop drive frequency and with varying amplitude, depending upon the actual sensor's amplitude. This varying amplitude, combined with the multiply block, produces a non-linear response, i.e., it provides a differing control authority depending upon the amplitude. Dividing η by its amplitude produces a sinusoid at the correct frequency but with unit amplitude. The unit amplitude eliminates any non-linearity. Since the feedback is at a faster rate than the loop gain, the loop gain uses a rate transition block prior to the multiply to insure signal compatibility.

The output of the multiply block is the drive signal at the correct frequency and amplitude, but with the incorrect phase due to the group delay through the DSP hardware and software. Correcting for the group delay can be accomplished in several ways. However, the novel way presented here is computationally efficient. The drive signal is first passed into a Hilbert filter block 1302, similar to the one in FIG. 11 (discussed above), but operating at 4 kHz and with a smaller filter order to save processor bandwidth for this less demanding application. The output is two drive signals in quadrature with the correct amplitude and frequency. The quadrature drive signals are passed from the Hilbert filter block 1302 into the Group Delay Compensation block 1303, along with the drive frequency.

Figure 14:
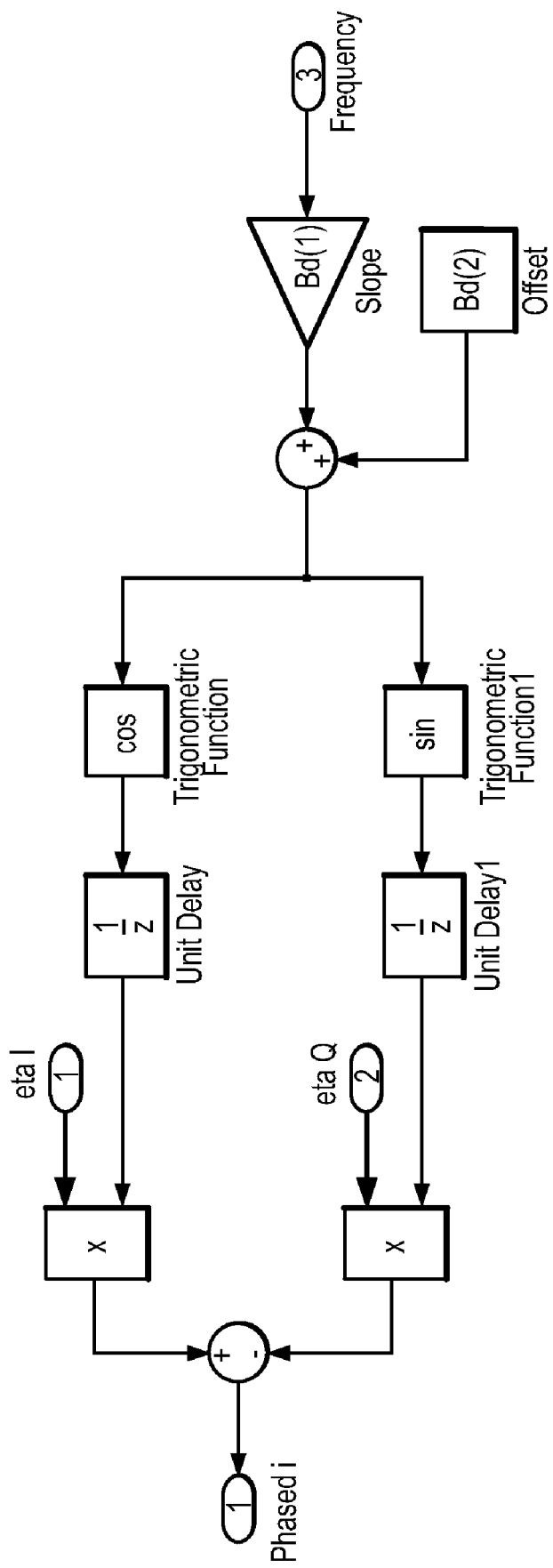
FIG. 14 shows a Group Delay Compensation block according to an embodiment of the invention.

FIG. 14 shows the Group Delay Compensation block 1303 according to an embodiment of the invention. In an offline, one-time fashion, the group delay through the DSP is characterized experimentally with an offset and slope. Alternatively, current sense hardware in the current amplifier can provide an option to calculate the group delay compensation on-line. The phase delay required to compensate for the group delay is a function of frequency, as previously discussed. The input frequency is used to calculate the required group delay compensation (i.e, the phase shift value (θ)) in the Group Delay Compensation block 1303, using the experimentally determined slope and offset. The drive quadrature signals are then multiplied by the sine and cosine of the required phase delay compensation and summed. The output of the sum block results in a drive signal that has the correct phase, frequency, and amplitude to drive the sensor at resonance.

Referring back to FIG. 13, the drive signal is fed into a switch on the left side of the figure. In normal operation the switch passes the drive signal through a Digital-to-Analog Converter (DAC) and a current amplifier and ultimately to the driver 180 (see FIG. 1). However, in the embodiment shown, there is logic included in the AGC block that enables a kickstart feature. Consequently, when the pickoff amplitude falls below a certain percentage of setpoint, or below a certain absolute value, the logic in the AGC block can assert an "Enable Kickstart" signal, switching into the kickstart mode. In the kickstart mode, energy is injected from the chirp block at the left top of the figure. The chirp block outputs a signal at close to the maximum current magnitude in an open-loop fashion. The chirp sweeps through several different frequency ranges until the sensor "starts", which is defined by the pickoff amplitude exceeding the kickstart target. The frequency ranges are based on last previous value of drive frequency, the range of frequencies corresponding to $K_1$ and a frequency corresponding to a density several times higher that the corresponding $K_2$ density, and a wide range covering a broad range of sensors. These various ranges insure that the sensor will start even if incorrect sensor parameters are input into the meter electronics 20, e.g. if the electronics is initialized with a master reset.

The output of the switch, whether in normal drive or kickstart mode, goes through the interpolation or upsample filter, typically to 8 kHz. The drive signal is updated at 8 kHz, with a final output rate at the codec (DAC) of 48 kHz. One skilled in the art will recognize that the choice of rates for the input, feedback, update rate, and output are tradeoffs based on performance requirements and processor bandwidths. The particular choices of rates can be optimized for selected hardware and for required performance. The particular filter implementations, including the filter order, the cutoff frequency, etc. are designed to match the chosen rates. It should be understood that the sampling rates, filter orders, cut-off frequencies, etc., are given for example only and the claims are not limited by any of the given examples.

Figure 15:
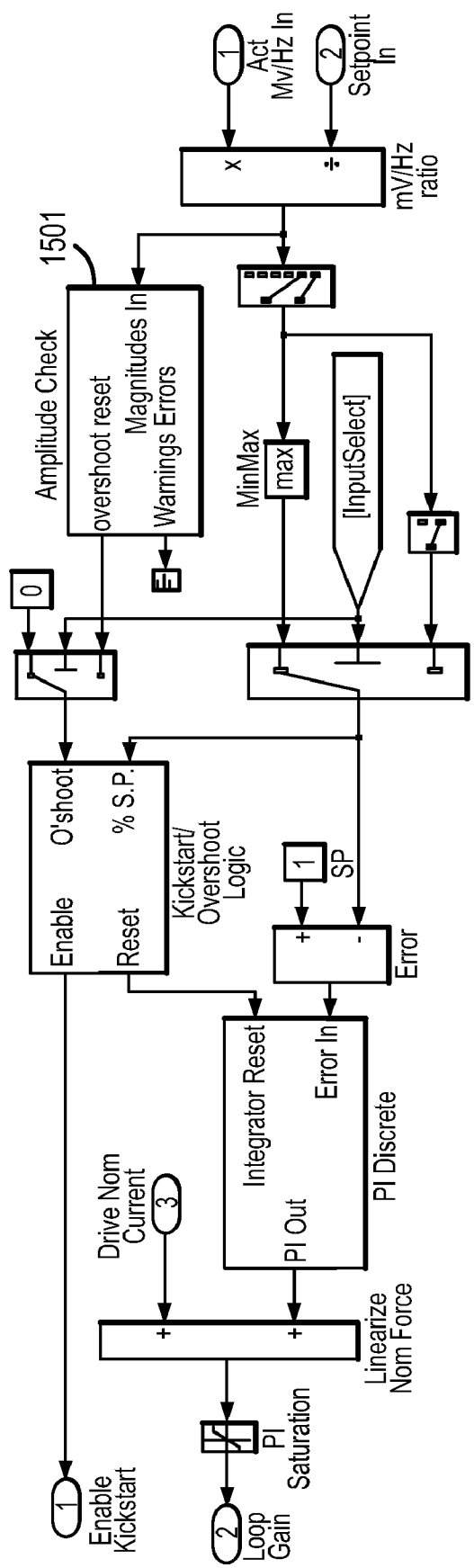
FIG. 15 shows an Automatic Gain Control (AGC) block according to an embodiment of the invention.

FIG. 15 shows the Automatic Gain Control (AGC) block 1301 according to an embodiment of the invention. The AGC receives as inputs the actual mV/Hz displacement amplitude (containing all 6 amplitudes) and the setpoint displacement (in mv/Hz). The AGC block 1301 has two outputs, an Enable Kickstart output and the Loop Gain output.

In the first block of the AGC block 1301, the inputs are ratioed to give a displacement percentage, i.e. when the actual displacement equals the setpoint, the actual ratioed displacement is 1.0. This scaling helps with linearizing the control loop for the various amplitude setpoints. The six ratioed amplitudes (peak detect/Hilbert for LPO, RPO, and η) are fed into an Amplitude Check diagnostic block 1501. This block checks to be sure that all six amplitudes yield consistent numbers that are near 1.0 and raises a warning or error flag if the differences exceed certain preset percentages. This block also detects if the sensor overshoots the setpoint by ~110%. If so, this block feeds the overshoot information to the Kickstart/Overshoot logic block.

The Kickstart/Overshoot logic block determines if the sensor amplitude is low or exceeds the overshoot threshold. If the amplitude is low, the Enable kickstart signal is asserted. If either the kickstart is enabled or if the amplitude is overshot, this block also sends a reset signal to the PI controller, discussed below.

At the mV/Hz ratio block, the signals for amplitude control are selected. For example, the LPO and RPO peak detect are selected. Alternatively, an argument can be made to select the Hilbert LPO and RPO amplitudes or the modal amplitude. In another alternative, the mV/Hz block can include logic that performs a selection based upon differences in noise, etc. In any event, the maximum of the LPO and RPO are selected for the control.

The output of the switch is fed into the Kickstart/Overshoot logic block, as well as being fed into the difference block. Since the setpoint is now normalized to 1, the error is simply the difference between the actual signal and 1. The error signal is fed into the PI Discrete block to determine the loop gain. The output of the PI Discrete block can be fed into a summer, where the nominal drive current is summed with the output of the PI block. In one embodiment, the implementation defaults to a nominal drive current of 0. A saturation block controls the maximum and minimum output currents from the summed output, resulting in the final loop gain.

The current amplifier can employ a linear amplifier. The output current can be substantially sinusoidal, such as until it hits a current limit, for example. The amplifier can operate in 4 quadrants, i.e., it can drive and absorb current in both positive and negative directions. This allows the drive control to brake the flowtube(s) during overshoot or when large amounts of flow noise excite the tube.

Figure 16:
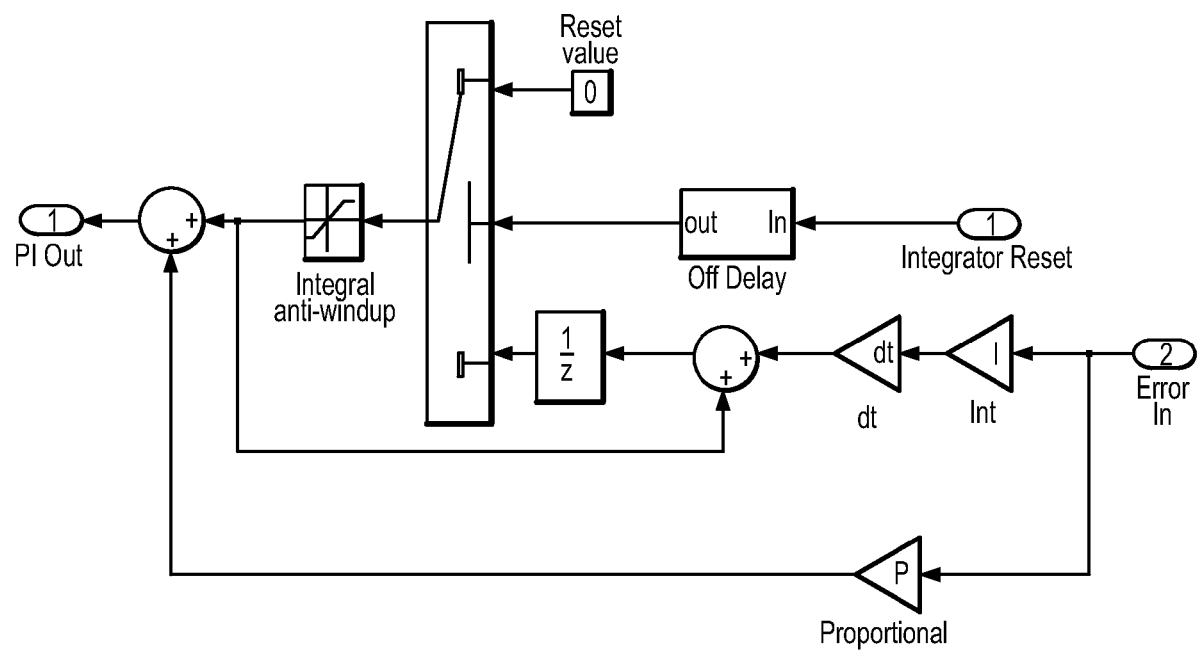
FIG. 16 shows a Proportional-Integral (PI) controller according to an embodiment of the invention.

FIG. 16 shows a Proportional-Integral (PI) controller according to an embodiment of the invention. The error signal is received into port 2 from the AGC block 1301. The lower leg multiplies the error by a proportional gain P and passes it into one node of the final summing block. In normal operation, i.e., when the integrator reset signal is not asserted, a simple discrete integrator used, wherein the new signal is added to the previous integrator output signal. The new signal is first multiplied by the integral gain I. It is then multiplied by the sample time which makes the integrator response independent of the sample time. Following standard controller design good practices, the integrator output is saturated with the "anti-windup" block. This feature keeps the integral from integrating to infinity if the error signal does not average to zero, as would happen in the case of entrained air, for example.

The integrator reset signal in one embodiment is high when the kickstart is on or when the tube overshoots the high amplitude level. In these cases the integrator output is set to zero. In the first case, the integrator does not start to wind up while the tube is trying to start, minimizing overshoot. To assist in this, an off-delay is used to hold the integrator off while the tube is coming up to amplitude. The reset during tube overshoot lets the control system drive the tube amplitude down more quickly than if the integrator had to wind back down. This feature dramatically cuts down on the overshoot when the tube is highly damped for a period of time, e.g., by entrained air, and the damping is suddenly remover, e.g., the air is stopped. Without the reset feature, the integrator would be at the full current limit while the tube was damped. Then when the damping is removed, the integrator would have been putting out full current and then integrating down at its time constant to a smaller value. The tube would be at too high of an amplitude for a significantly longer time without the reset on overshoot feature.

Figure 17:
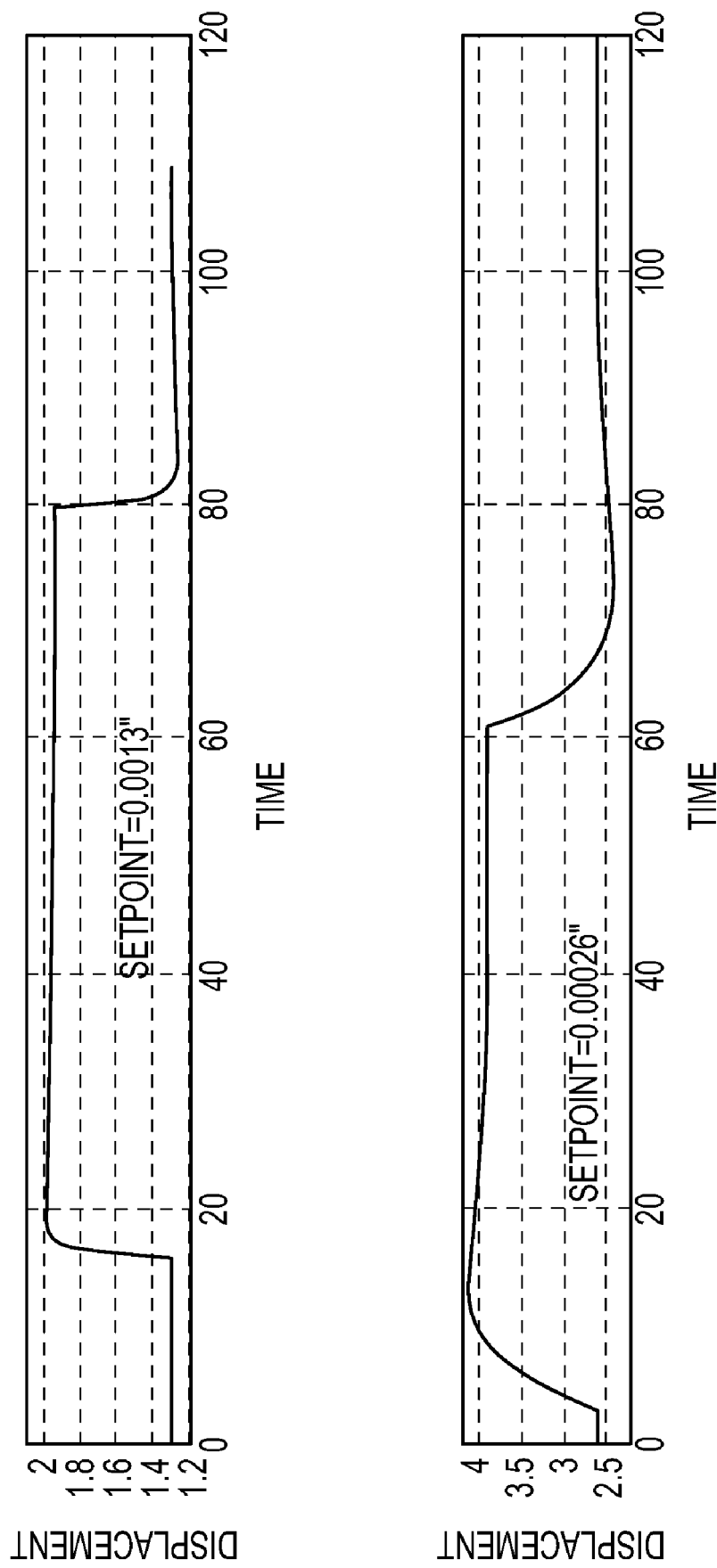
FIG. 17 includes three drive signal plots that are representative of a flowtube operation in the prior art.

FIG. 17 includes two drive signal plots that are representative of a flowtube operation in the prior art. The figure shows some of the issues associated with the non-linear drive control approaches of the prior art. The top plot in the figure shows that a standard, non-linear control loop takes several seconds to initiate tube motion, after which there is a substantial overshoot followed by a long slow approach to the setpoint amplitude. The bottom plot shows a similar curve, but here the initial condition is a larger-than-setpoint amplitude, which triggers the drive to turn off. These plots are part of a traditional Ziegler-Nichols tuning process.

Note that after the drive shuts down there is an even longer time to start up than the initial start-up. Some of this involves the sometimes quite long time constant of the flowmeter sensor (see below). The slow startup followed by an overshoot is characteristic of a non-linear drive system. While tuning of the PID loop can speed up the startup and minimize the overshoot, at best the tuning only compensates for one condition of a non-linear system. The end result in a drive control loop that is not very robust to perturbations, such as noisy gas flows, slug/two phase flow, or design changes to the driver and pickoffs.

A typical flowmeter drive control loop is non-linear in two respects. The first, most obvious, non-linearity is the fact that the feedback velocity is multiplied by the gain. By definition this multiplication is non-linear. Furthermore, the pickoff response, acting as one of the multiplicands, depends upon the sensor dynamics, making the non-linearity sensor dependent.

The second non-linearity is a bit more subtle. The standard equation for a linear sensor response is given below, $$[H]\{F\}=\{x\} \text{ or } [D]\{x\}=\{F\} \qquad (12)$$

where H is the frequency response function, D is the dynamical matrix, x is the response, and F is the force.

What is typically left out of these equations, but is an important assumption, is the fact that the equations are linearized about a nominal operating point. The equation for the linear system is given more precisely as:

$$[H]\{F-F_0\}=\{x-x_0\} \text{ or } [D]\{x-x_0\}=\{F-F_0\} \qquad (13)$$

where the $_0$ subscript refers to a nominal displacement and a nominal force. Since the standard control loop does not account for nominal forces or nominal amplitudes, the response of the sensor, as well as the response of the entire feedback control system, is a function of the setpoint. The nominal forces and amplitudes are of course dependent on the mass, stiffness, and damping of the flowmeter structure, as well as the BL sensitivity coefficients of the drive and pickoff coils.

The meter electronics and methods in some embodiments include changes in the feedback control loop to linearize the system. There are two steps to linearizing the system, accounting for the two non-linearities described above. Either (or both) can be used to advantage in the improved drive feedback system of the invention. The result is a linear control loop that robustly controls the drive. In addition, the invention linearizes the control loop while automatically accounting for any differences in sensor dynamics, making the design robust for any given sensor design.

The first linearization removes the multiplicative non-linearity by forcing the response to be unity. There are a number of ways to accomplish this, e.g., using a correction factor or twiddle signal, converting to a unit square wave for a digital square wave drive, etc. The method shown below uses the already-calculated amplitude signal to normalize the feedback to unity. Even though there is still a multiplication operation, multiplying by 1 does not add a non-linearity.

Figure 18:
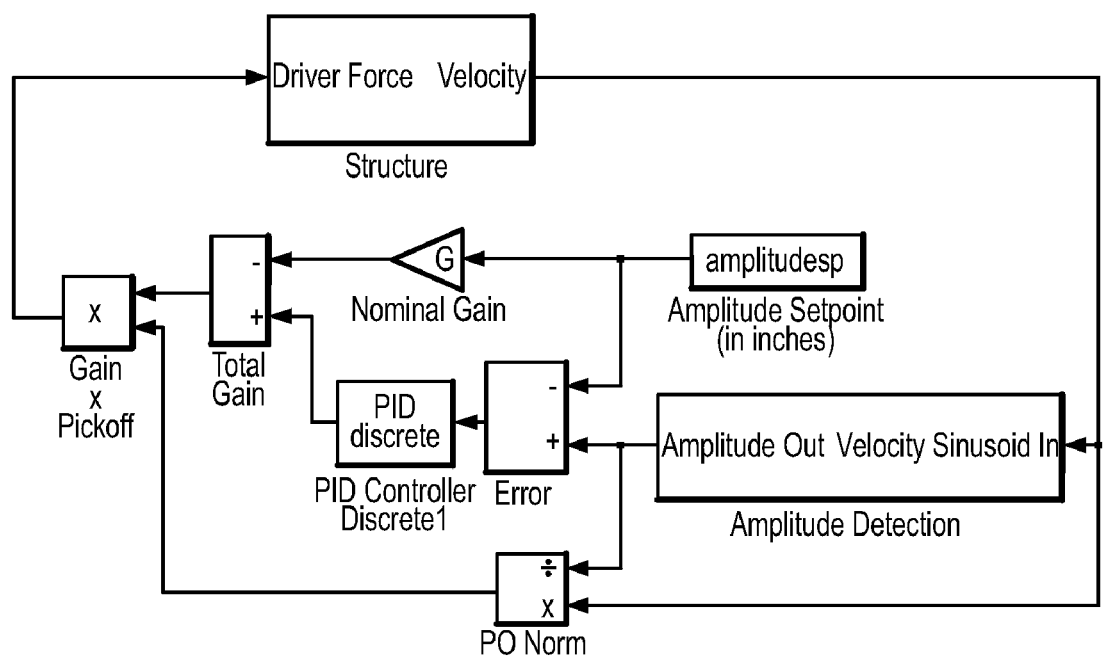
FIG. 18 shows a linearized drive control block diagram according to an embodiment of the invention.

FIG. 18 shows a linearized drive control block diagram 1800 according to an embodiment of the invention. In the figure, the pickoff feedback is normalized by the amplitude in the "PO Norm" block at the bottom of the figure. Note that variations in any of the sensor dynamics are automatically accounted for by this method. The second linearization adds in a nominal force based upon the setpoint. The amplitude setpoint is multiplied by a "Nominal Gain" block, and added to a Proportional-Integral-Derivative (PID) gain in the "Total Gain" block. Adding the nominal gain output to the PID gain results in a sensor system that offers an effectively zero damping, i.e., it is marginally stable. In control terms, this linearized system is not "droopy", i.e., the PID output is zero when the system reaches the setpoint. No error is required in order to produce the nominal force. While the nominal gain is a function of the sensor dynamics, the control system is now sensor independent. Consequently, an optimized set of PID gains will work for a very wide range of sensors.

In the standard control system, which is quite droopy, the error multiplied by the proportional gain plus the integrated error multiplied by the integral gain is used to give the nominal force. As a result, the droopiness is very much a function of the sensor's mass, stiffness, and damping.

The key to this approach is the nominal gain value. This value can be found in many different ways. In a modal based, self-characterizing sensor approach, the nominal gain is simply the measured damping value. A simplified diagnostics approach can be used to generate the correct value. The nominal gain can be identified with a simple "ping" of the driver at startup and performing a quick and crude system ID. The nominal gain can be in a lookup table based on frequency, the measured drive Frequency Response Function (FRF), or the RTD resistance, for example.

An easy alternative to getting the measured gain is to let the sensor start up with zero nominal gain, and after the error is minimized by the standard PID loop, transfer the PID gain number into the nominal gain and reset the PID integrator output.

With this scheme, any variation of the PID gain from zero will be indicative of system changes due to changes in the sensor, mounting, or fluid conditions. Short or long term variation of the PID gain can be a simple, powerful diagnostic.

Figure 19:
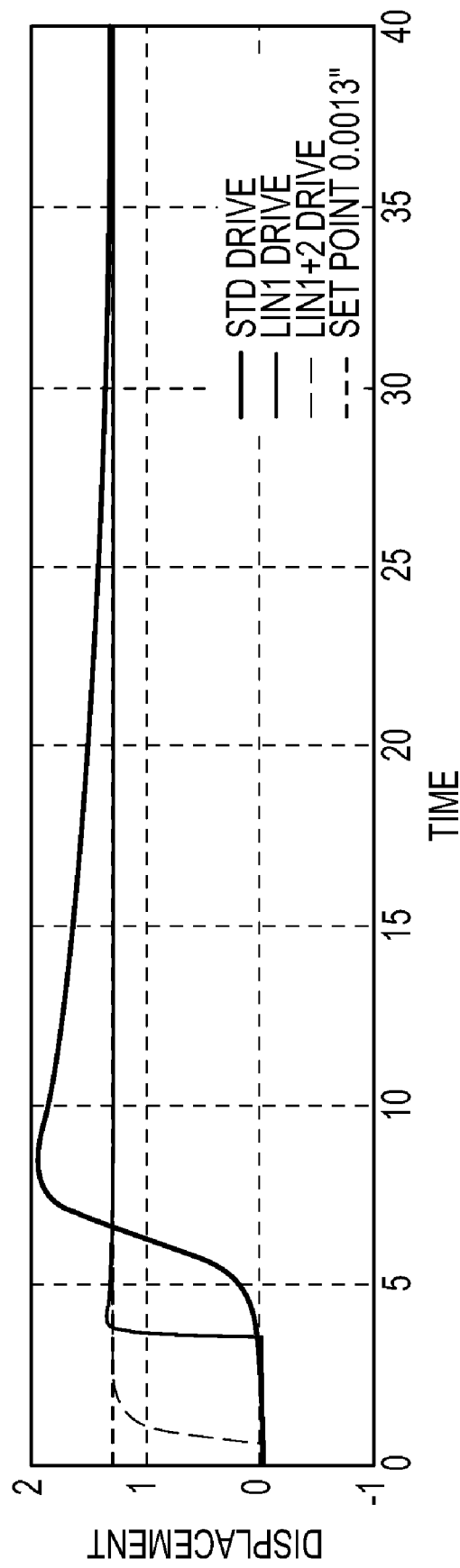
FIG. 19 comprises graphs of the linearized drive control according to an embodiment of the invention.
Figure 19:
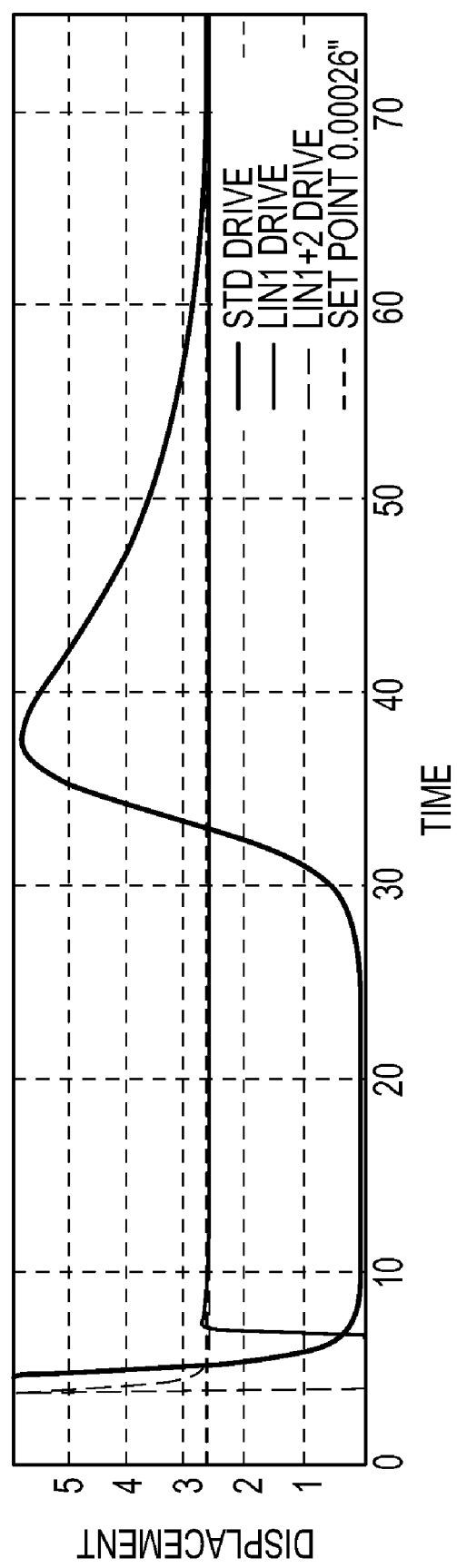

FIG. 19 comprises graphs of the linearized drive control according to an embodiment of the invention. The figure shows that these linearizations decrease startup and recovery times, speed up system response, and make the PID gains invariant to amplitude. The figure shows that the improvements according to the invention will increase sensor performance on difficult fluids such as two-phase flow.

FIG. 19 shows that the first linearization dramatically reduces startup overshoot and reduces the time required in order to achieve the setpoint amplitude. Using both linearizations results in substantially no overshoot and a much quicker startup. The bottom plot of FIG. 19 shows that the first linearization reduces the recovery time. Using both linearizations eliminates any recovery time. No "if" statements are required in the linearized loops to get this performance increase.

Figure 20:
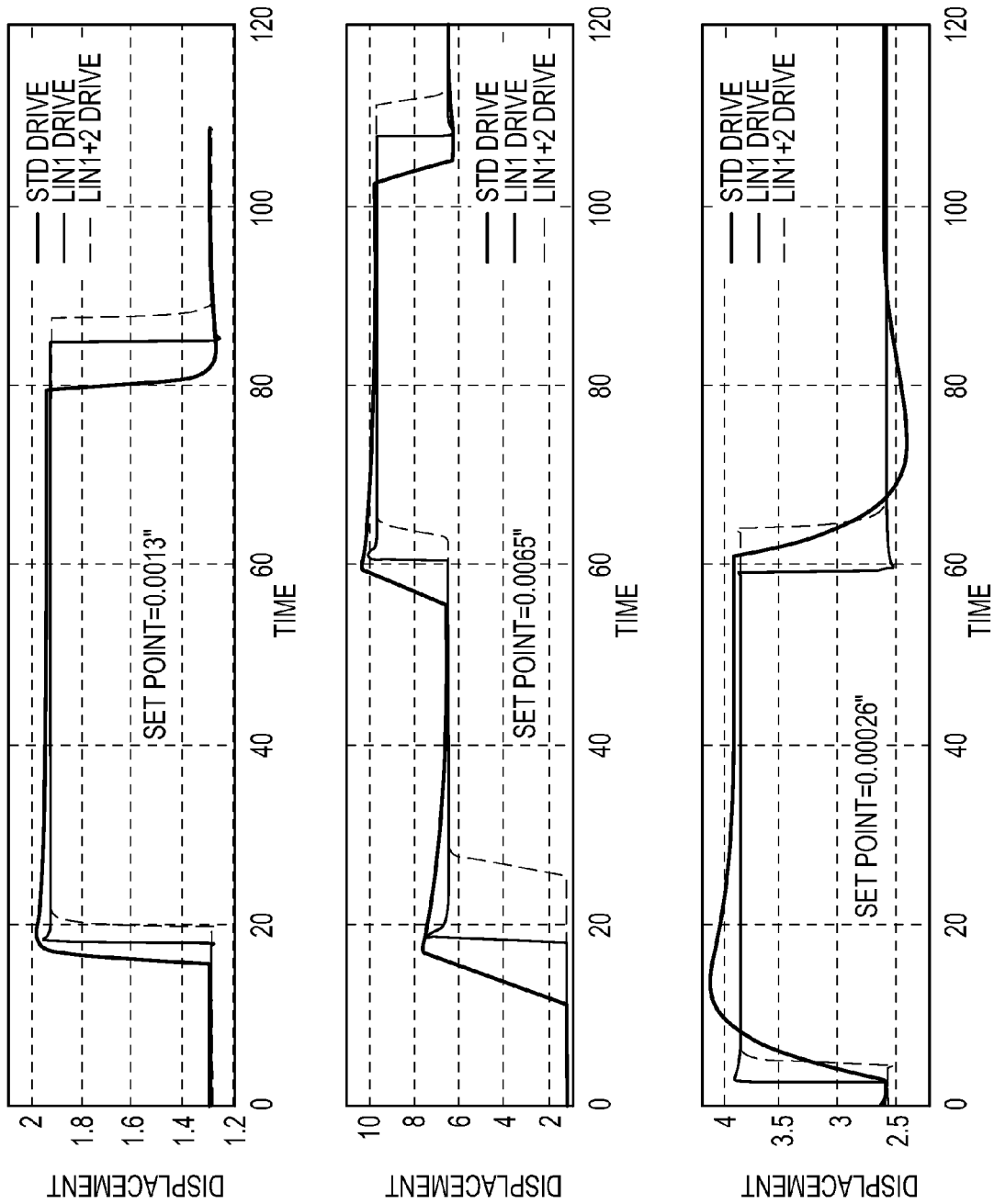
FIG. 20 comprises graphs that show the setpoint amplitude independence of a linearized drive loop.

FIG. 20 shows the setpoint amplitude independence of the linearized loops. At a factor of 5 increase and decrease in amplitude, the linearized control loops show similar, much improved performance over the standard control loop. Much improved performance, e.g., faster response, less overshoot/undershoot, faster startup/recovery, etc., will translate into better drive performance on difficult fluids. The improved performance and linearization of the drive loop will also result in fewer constraints on the designers of sensor geometries, drivers and pickoffs.

The meter electronics and methods according to the invention can be employed according to any of the embodiments in order to provide several advantages, if desired. The invention provides an accurate drive signal. The invention provides a drive signal for any manner of pickoff sensor. The invention substantially instantaneously determines a drive signal. The invention provides a drive signal that rapidly and accurately tracks a sensor signal. The invention provides a faster drive signal response to changing flow conditions. The invention provides a drive signal that detects and follows flow anomalies in a flow material.

The invention provides a drive signal wherein the drive signal phase is substantially locked in phase with the sensor signal phase. The invention provides a drive signal wherein the drive signal phase is substantially locked in phase without using feedback. The invention provides a drive signal that does not control (or need to control) the output frequency value.

The invention provides a fast phase compensation that advantageously can be coupled to a fast frequency determination. The invention minimizes a current requirement for the drive signal. The invention provides a better flow tube response to entrained air conditions and to empty-full-empty operation. The invention enables a flowmeter to drive closer to a resonance frequency. The invention enables a more accurate characterization of noise on the sensor signal. The invention enables a highly accurate implementation of flowmeter diagnostics.

We claim:
1. A method for generating a drive signal for a vibratory flowmeter (5), the method comprising:
receiving a sensor signal (210) from the vibratory flowmeter (5);
phase-shifting the sensor signal (210) substantially 90 degrees to create a phase-shifted sensor signal;
determining a sensor signal amplitude (214) from the sensor signal (210) and the phase-shifted sensor signal;
linearly correlating a frequency response of the sensor signal (210) to a frequency/phase relationship in order to produce a phase shift value ($\theta$);

combining the phase shift value (θ) with the sensor signal (210) and the phase-shifted sensor signal in order to generate a drive signal phase (213); and generating a drive signal including a drive signal amplitude (215) and the drive signal phase (213), wherein the drive signal phase (213) is substantially identical to a sensor signal phase (212).

2. The method of claim 1, wherein the phase-shifting is performed by a Hilbert transform.

3. The method of claim 1, the determining the sensor signal amplitude (214) comprising:

receiving an A cos ωt term representing the sensor signal (210);

generating an A sin ωt term from the phase-shifting;

squaring the A cos ωt term and the A sin ωt term; and taking a square root of the sum of the A sin ωt squared term and the A sin ωt squared term in order to determine the sensor signal amplitude (214).

4. The method of claim 1, with the generating the drive signal amplitude (215) further comprising:

comparing the sensor signal amplitude (214) to an amplitude target (216); and scaling the sensor signal amplitude (214) in order to generate the drive signal amplitude (215), with the scaling being based on the comparing of the sensor signal amplitude (214) to the amplitude target (216).

5. The method of claim 1, further comprising chirping the drive signal at a startup of the flowmeter (5).

6. The method of claim 1, further comprising chirping the drive signal at a startup of the flowmeter (5), with the chirping comprising sweeping through two or more frequency ranges until the flowmeter (5) starts.

7. The method of claim 1, further comprising linearizing the drive signal.

8. The method of claim 1, further comprising:

calculating a second amplitude using peak detection;

comparing the sensor signal amplitude (214) to the second amplitude; and detecting broadband noise on a pickoff sensor if the second amplitude is high than the sensor signal amplitude (214).

\* \* \* \* \*